US012592431B2

(12) United States Patent
Barrowclift et al.

(10) Patent No.: US 12,592,431 B2
(45) Date of Patent: Mar. 31, 2026

(54) PORTABLE POWER SUPPLY

(71) Applicant: MILWAUKEE ELECTRIC TOOL CORPORATION, Brookfield, WI (US)

(72) Inventors: Michael A. Barrowclift, East Troy, WI (US); Maria Krutikova, Wauwatosa, WI (US); Max Karbin, Milwaukee, WI (US); James P. Elfering, Antioch, IL (US); Swapnil Suresh Rathod, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 557 days.

(21) Appl. No.: 17/993,199

(22) Filed: Nov. 23, 2022

(65) Prior Publication Data

US 2023/0163382 A1      May 25, 2023

Related U.S. Application Data

(60) Provisional application No. 63/407,921, filed on Sep. 19, 2022, provisional application No. 63/304,336, filed on Jan. 28, 2022, provisional application No. 63/282,477, filed on Nov. 23, 2021.

(51) Int. Cl.
H01M 10/6563 (2014.01)
H01M 10/615 (2014.01)
(Continued)

(52) U.S. Cl.
CPC ..... H01M 10/6563 (2015.04); H01M 10/615 (2015.04); H01M 10/623 (2015.04);
(Continued)

(58) Field of Classification Search
None
See application file for complete search history.

(56) References Cited

U.S. PATENT DOCUMENTS 6,967,464 B2 * 11/2005 Heigl ........................ H02J 7/00
                                                    320/107
8,154,137 B1     4/2012 Flegel
(Continued)

FOREIGN PATENT DOCUMENTS

CN       210516810 U      5/2020
CN       211456714       * 9/2020      .......... H01M 10/613
(Continued)

OTHER PUBLICATIONS

International Search Report and Written Opinion for Application No. PCT/US2022/050866 dated Apr. 17, 2023 (12 pages).

*Primary Examiner* — Amanda J Barrow
(74) *Attorney, Agent, or Firm* — Michael Best & Friedrich LLP

(57) ABSTRACT

A portable power supply including a housing, at least one battery cell, a charger, and an attachment. The housing defines a cavity. The housing includes an upper portion, a lower portion, a plurality of air inlets defined in the lower portion, and a plurality of air outlets defined in the upper portion. The plurality of air inlets is in fluid communication with the cavity. The plurality of air outlets is in fluid communication with the cavity. The at least one battery cell is disposed in the cavity. The charger is electrically coupled with the battery cell. The attachment is coupled to the upper portion. The attachment is configured to at least partially cover each of the air outlets such that airflow exiting the air outlets travels a circuitous path.

11 Claims, 25 Drawing Sheets

(51) Int. Cl.

| | |
|---|---|
| *H01M 10/623* | (2014.01) |
| *H01M 50/24* | (2021.01) |
| *H01M 50/251* | (2021.01) |
| *H01M 50/691* | (2021.01) |
| *H02J 7/00* | (2006.01) |

(52) U.S. Cl.
CPC ......... *H01M 50/24* (2021.01); *H01M 50/251* (2021.01); *H01M 50/691* (2021.01); *H02J 7/0045* (2013.01); *H01M 2220/10* (2013.01)

(56)  References Cited

U.S. PATENT DOCUMENTS

| | | | |
|---|---|---|---|
| 9,553,297 B2 | 1/2017 | Kolden et al. | |
| 2003/0096160 A1 | 5/2003 | Sugiura et al. | |
| 2015/0171632 A1* | 6/2015 | Fry ....................... | H02J 7/0025 |
| | | | 307/22 |
| 2016/0285295 A1* | 9/2016 | Marinov ............... | H01M 10/46 |
| 2016/0294203 A1* | 10/2016 | Teng .................... | H02J 7/0045 |
| 2018/0191183 A1* | 7/2018 | Namiki .............. | H05K 7/20145 |
| 2021/0167430 A1* | 6/2021 | Silha .................... | H01M 50/20 |
| 2021/0184277 A1* | 6/2021 | Polchinski .......... | H01M 10/425 |
| 2022/0344741 A1* | 10/2022 | Zeng ................. | H01M 10/6566 |

FOREIGN PATENT DOCUMENTS

| | | | | | |
|---|---|---|---|---|---|
| EP | 1209794 B1 | | 8/2006 | | |
| JP | 11-185789 | * | 7/1999 | .............. | H01M 8/04 |
| JP | 11-185790 | * | 7/1999 | .............. | H01M 8/04 |
| WO | WO 2019/136869 | * | 7/2019 | ................ | H02J 7/00 |
| WO | WO 2021/115227 | * | 6/2021 | .......... | H01M 10/613 |

* cited by examiner

SEALED BATTERY SUBSYSTEM

SEALED CHARGER SUBSYSTEM

PORTABLE POWER SUPPLY

CROSS-REFERENCE TO RELATED APPLICATIONS

This application claims priority to U.S. Provisional Patent Application No. 63/282,477 filed on Nov. 23, 2021, U.S. Provisional Patent Application No. 63/304,336 filed on Jan. 28, 2022, and U.S. Provisional Patent Application No. 63/407,921 filed on Sep. 19, 2022, the entire contents of which are incorporated by reference herein.

FIELD

The present disclosure relates to structures having a housing, and more particularly to structures such as a storage container, a battery storage container, a battery, a battery charger, and a power tool.

BACKGROUND

The internal temperature of a power supply can increase over time due to extended periods of use, extended exposure to solar irradiation, and other reasons. When a first entity is relatively colder than a second entity, bringing the first entity and the second entity together will yield a resultant temperature for both entities that is somewhere between the relatively lower temperature of the first entity and the relatively higher temperature of the second entity.

SUMMARY

The disclosure provides, in one aspect, a portable power supply including a housing, at least one battery cell, a charger, and an attachment. The housing defines a cavity. The housing includes an upper portion, a lower portion, a plurality of air inlets defined in the lower portion, and a plurality of air outlets defined in the upper portion. The plurality of air inlets is in fluid communication with the cavity. The plurality of air outlets is in fluid communication with the cavity. The at least one battery cell is disposed in the cavity. The charger is electrically coupled with the battery cell. The attachment is coupled to the upper portion. The attachment is configured to at least partially cover each of the air outlets such that airflow exiting the air outlets travels a circuitous path.

In some aspects of the portable power supply, the at least one of the plurality of air inlets is additionally configured as a liquid drain opening.

In some aspects of the portable power supply, the attachment includes at least one coupling interface provided on a surface of the attachment that is opposite the upper portion.

In some aspects of the portable power supply, the air outlets are upwardly facing.

In some aspects, the attachment includes a wall angled relative to an axis that is defined by and extends through the air outlets such that the wall redirects airflow.

In some aspects, the attachment includes a downwardly depending sidewall. The downwardly depending sidewall defines a plurality of attachment outlet apertures such that airflow redirected by the wall is configured to exit through the attachment outlet apertures.

In some aspects, the upper portion includes an upwardly extending ridge disposed adjacent the air outlets.

In some aspects, the upper portion further includes a drainage trough, the ridge disposed between the drainage trough and the air outlet.

In some aspects, the attachment includes a gap between the downwardly depending sidewall and the wall, the gap in fluid communication with the drainage trough.

In some aspects, the drainage trough extends along at least a portion of the perimeter of the upper portion.

In some aspects, the upper portion further includes a plurality of drainage openings, and the drainage trough is in fluid communication with the drainage opening.

In some aspects, the charger is disposed in the cavity.

The disclosure provides, in another aspect, a portable power supply including a housing, a fan, at least one battery cell, and a charger. The housing includes an outer wall, an inner wall, and an airflow passage. The inner wall defines a cavity in the housing. The airflow passage is disposed between the outer wall and the inner wall. The fan is coupled to the housing. The fan is configured to force airflow through the airflow passage. The at least one battery cell is disposed in the cavity. The charger is electrically coupled with the battery cell.

In some aspects, the outer wall is coupled to the inner wall by a plurality of fasteners.

In some aspects, the fan is disposed between the inner and the outer wall.

In some aspects, an inlet of the airflow passage is formed in the portable power supply at a location opposite from an outlet of the airflow passage such that airflow entering the inlet travels in a direction that is parallel to a direction of airflow exiting the outlet.

In some aspects, the airflow passage is disposed within a majority of a perimeter of a cross-section of the portable power supply.

In some aspects, the charger is disposed within the cavity.

The disclosure provides, in another aspect, a portable power supply including a housing, at least one battery cell, and a charger. The housing defines a cavity. The housing includes an upper portion, a lower portion, a plurality of air inlets defined in the lower portion, and a plurality of air outlets defined in the upper portion. The plurality of air inlets is in fluid communication with the cavity. The plurality of air outlets is in fluid communication with the cavity. The plurality of air outlets open laterally. The at least one battery cell is disposed in cavity. The charger is electrically coupled with the battery cell.

In some aspects, a deflector is disposed in the cavity. The deflector is disposed in the cavity. The deflector and the upper portion cooperating to define a duct including a downwardly opening portion. At least on of the plurality of air inlets is aligned vertically with the downwardly opening portion.

In some aspects, the upper portion includes an interface configured to receive a lower portion of a stacking interface.

In some aspects, the upper portion includes one or more raised upper surfaces. The plurality of air outlets is opened laterally between a top surface of the upper portion and the one or more raised upper surfaces.

In some aspects, the cavity is one of a plurality of cavities.

In some aspects, the portable power supply further includes an attachment coupled to the upper portion. The attachment is configured to at least partially cover each of the air outlets such that airflow exiting the air outlets travels a circuitous path.

The disclosure provides, in another aspect, a portable power supply including a housing, at least one battery cell, a charger, and a frame. The housing defines a cavity. The housing includes an upper portion, a lower portion, and a plurality of vents. The plurality of vents is defined in the housing. The plurality of vents is configured to release heated air from within the cavity. The at least one battery cell is disposed in the cavity. The charger is electrically coupled with the battery cell. The frame extends around the housing. A portion of the frame at least partially covers the plurality of vents.

In some aspects, the frame is positioned at a distance from the plurality of vents.

In some aspects, the housing comprises a polymer. The housing includes one or more weld lines. At least one of the weld lines extends in a direction transverse to at least one of the plurality of vents.

In some aspects, the housing further includes a plurality of louvers that define the plurality of vents. At least one louver is intersected by a respective weld line.

The disclosure provides, in another aspect, a portable power supply including a housing, a first subsystem, a first fan, a second subsystem, a second fan, and an airflow duct. The housing defines a cavity therein. The first subsystem is disposed within the cavity. The first subsystem emits heat. The first fan is configured to induce a first exhaust airflow in a first direction, thereby transferring heat away from the first subsystem in the first direction. The second subsystem is disposed within the cavity. The second subsystem emits heat. The second fan is configured to induce a second exhaust airflow in a second direction, thereby transferring heat away from the second subsystem. The airflow duct receives the first exhaust airflow and the second exhaust airflow. The airflow duct redirects the first exhaust airflow and the second exhaust airflow out of the housing.

In some aspects, the airflow duct includes a baffle that defines a first subchannel and a second subchannel within the airflow duct. The first subchannel receives the first exhaust airflow, and the second subchannel receives the second exhaust airflow.

In some aspects, one of the first fan and the second fan is integrally formed with the airflow duct.

In some aspects, the airflow duct is a first airflow duct, and the portable power supply further includes a second airflow duct.

In some aspects, the first airflow duct receives a portion of the first exhaust airflow and a portion of the second exhaust airflow. The second airflow duct receives another portion of the first exhaust airflow and another portion of the second exhaust airflow.

In some aspects, the airflow duct includes a plurality of drain holes for directing flow of environmental ingress out of the housing.

In some aspects, the first subsystem is a battery subsystem, and the second subsystem is a charger subsystem.

In some aspects, the housing includes a mounting port for coupling the second subsystem to the housing. The airflow duct is couplable to the same mounting port as the second subsystem.

In some aspects, the air duct redirects the first exhaust airflow out of the housing along a third direction, and the air duct redirects the second exhaust airflow out of the housing along the third direction, and the third direction extends transverse to the first direction and the second direction.

In some aspects, the first direction is orthogonal to the second direction.

The disclosure provides, in another aspect, a portable power supply including a housing, a first subsystem, a second subsystem, and an airflow duct. The housing defines a cavity therein. The first subsystem is disposed within the cavity. The first subsystem emits heat. The second subsystem is disposed within the cavity. The second subsystem emits heat. The airflow duct includes a channel defined therein and a baffle. The baffle extends through the channel such that the channel is divided into a first subchannel and a second subchannel. The first subchannel receives a first exhaust airflow transferring heat from the first subsystem. The second subchannel receives a second exhaust airflow transferring heat from the second subsystem.

In some aspects, the portable power supply further includes a fan that is in fluid communication with the first subchannel.

In some aspects, the first subchannel is larger than the second subchannel.

In some aspects, the air duct further includes a seal provided on a periphery of the air duct at an outlet opening of the channel. The seal is formed with a thermoplastic elastomer overmold that creates an interference between a housing of the portable power supply and the outer housing of the air duct.

The disclosure provides, in another aspect, a portable power supply including a housing, a control system, a subsystem, and an airflow duct. The housing defines as cavity therein. The control system is disposed in the cavity and is configured to control operation of the portable power supply. The subsystem is sealed within the cavity. The subsystem emits heat. The airflow duct includes a fan for directing heat out of the housing and a thermistor for monitoring a temperature within the cavity and the airflow duct. The thermistor is configured to convey a temperature signal to the control system.

In some aspects, the thermistor is positioned downstream of the fan.

In some aspects, the control system inhibits operation of the portable power supply when the control system receives a temperature signal from the thermistor indicating that an ambient system temperature is outside of an operating temperature range for the portable power supply.

In some aspects, the airflow duct is a first airflow duct including a first fan and a first thermistor. The portable power supply further includes a second airflow duct having a second fan and a second thermistor. The control system inhibits operation of the portable power supply when the control system receives a temperature signal from at least one of the first thermistor and the second thermistor indicating that an ambient system temperature is outside of an operating temperature range for the portable power supply.

Other features and aspects of the invention will become apparent by consideration of the following detailed description and accompanying drawings.

DETAILED DESCRIPTION

Figure 1:
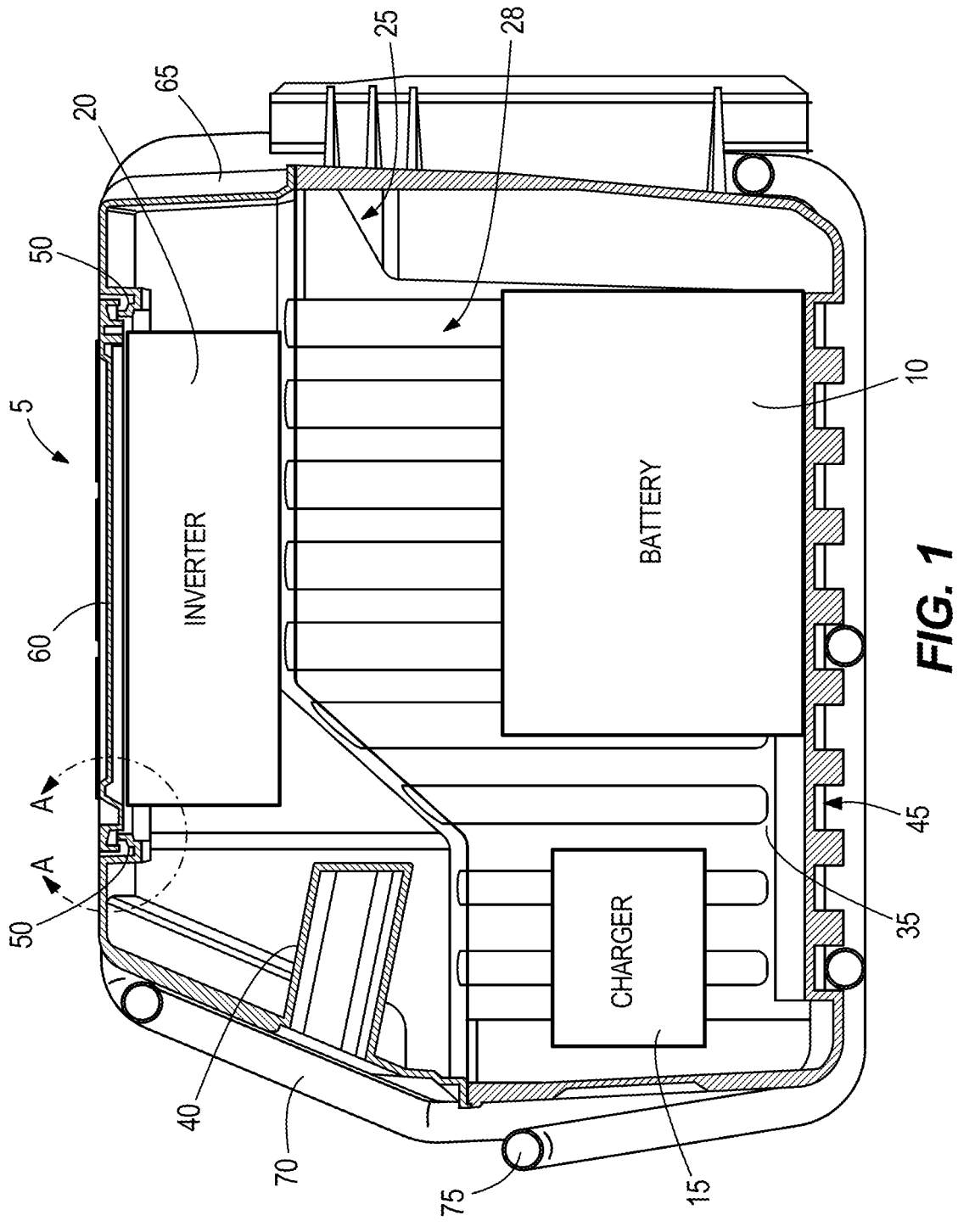
FIG. 1 is a cross-sectional side view of a portable power supply.
Figure 2:
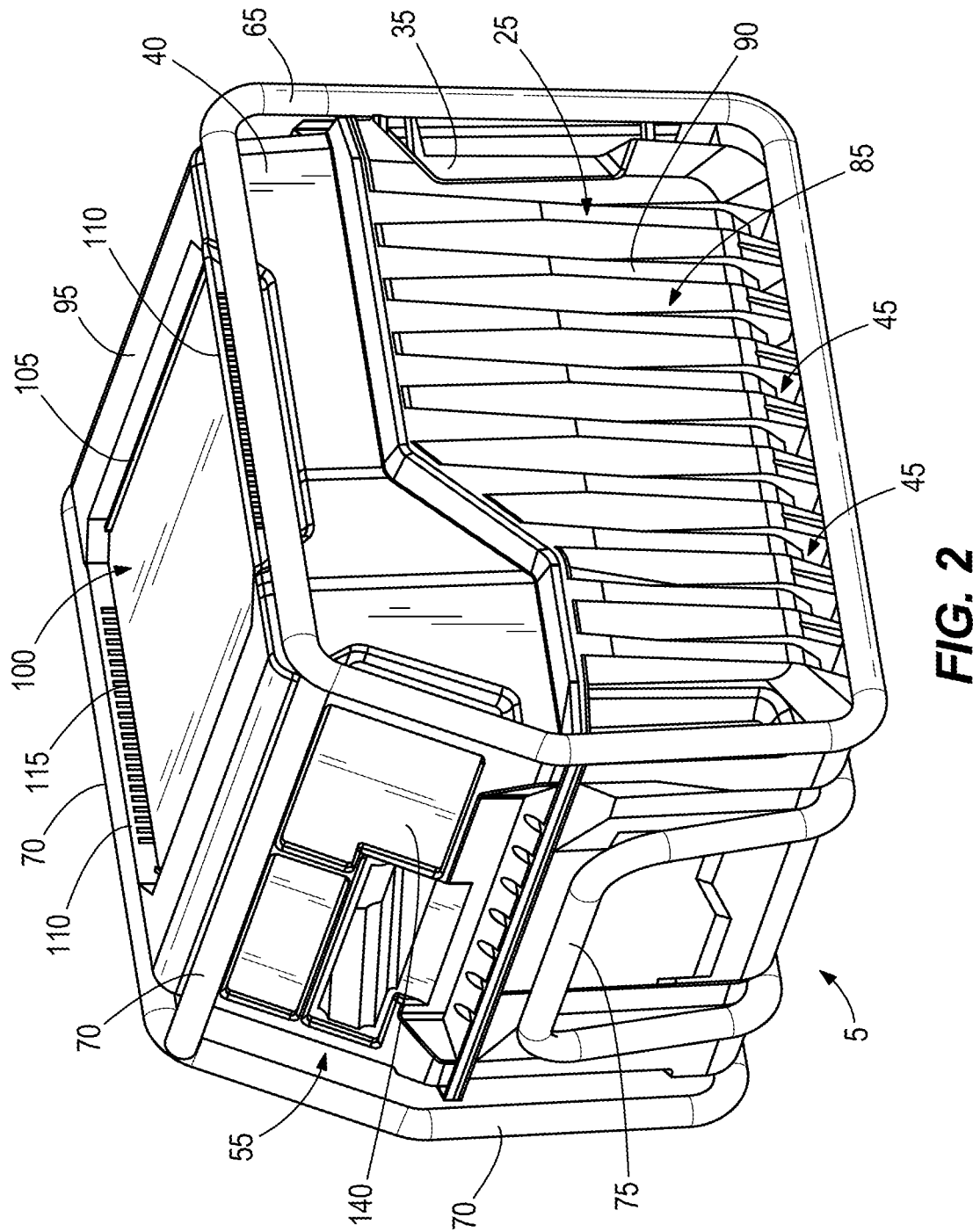
FIG. 2 perspective view of the portable power supply of FIG. 1 with an attachment missing.

FIGS. 1-2 illustrate a portable power supply 5 having a battery 10, a charger 15, an inverter 20, a housing 25 that defines a cavity 28 in the interior of the housing 25 such that the battery 10, the charger 15, and the inverter 20 are disposed within the cavity 28. The housing 25 further includes a lower portion 35, an upper portion 40, a plurality of air inlets 45 defined in the lower portion 35, and a plurality of air outlets 50 defined in the upper portion. The plurality of air inlets 45 is in fluid communication with the cavity 28. The plurality of air outlets 50 is in fluid communication with the cavity 28 such that the plurality of air inlets 45 and the plurality of air outlets are in fluid communication with each other. The portable power supply 5 further includes a user interface 55 and an attachment 60. In the illustrated embodiment, the attachment 60 is a charging plate that is configured to electrically engage chargeable objects (e.g., batteries), as will be described in more detail below. The attachment 60 is coupled to the upper portion 40 and configured to at least partially cover each of the plurality of air outlets 50 such that airflow exiting the plurality of air outlets 50 travels a circuitous path. In other embodiments, any one of the battery 10, the charger 15 and the inverter 20 may be positioned outside of the cavity 28. In further embodiments, the portable power supply 5 may just have one or any combination of the battery 10, the charger 15, and the inverter 20.

In the present embodiment, the battery 10 may have any suitable chemistry for storing and providing electricity, or energy. For example, the battery 10 may be formed of Lithium-ion (Li-ion), Nickel-Cadmium (Ni-Cad), or other suitable chemistry. The charger 15 is positioned adjacent the battery 10 within the cavity 28 such that the battery 10 may be electrically connected to the charger 15. The charger 15, cooperating with an external powering means, is configured to charge the battery 10. In some embodiments, the charger 15 may be positioned outside of the cavity 28. The battery 10 may output electricity via a direct current (i.e., DC) to the inverter 20. The inverter 20 transforms the direct current provided by the battery 10 into an alternating current (i.e., AC), and thus, the portable power supply 5 is configured to provide, or output, an alternating current. As such, the portable power supply 5 may function, in a non-limiting manner, substantially similarly to an electric wall outlet. In some embodiments, the portable power supply 5 may not include the inverter 20. In such embodiments, the battery 10 is a battery pack including one or more battery cells configured to provide electricity to, for example, a power tool.

The housing 25 is surrounded by a frame 65 that includes a plurality of bar members 70. In the illustrated embodiment, the frame 65 is provided such that the frame 65 envelops the outer periphery of the portable power supply 5. That is, the frame 65 is provided on each side of the portable power supply 5. As such, the frame 65 provides support for the portable power supply 5 when the portable power supply 5 is in an upright position as illustrated in FIG. 2. The frame is also configured to support the portable power supply 5 if the portable power supply 5 is tipped over from the upright position illustrated in FIG. 2. The frame 65 further includes a handle portion 75. The handle portion 75 is configured to be gripped by a user for the purpose of transporting the portable power supply 5. In some embodiments, the frame 65 may be metal. In other embodiments, the frame 65 may not be formed as a unitary body such that the frame 65 includes separate individual components positioned in any orientation around the housing 25. In further embodiments, the portable power supply 5 may not have a frame 65.

Figure 19:
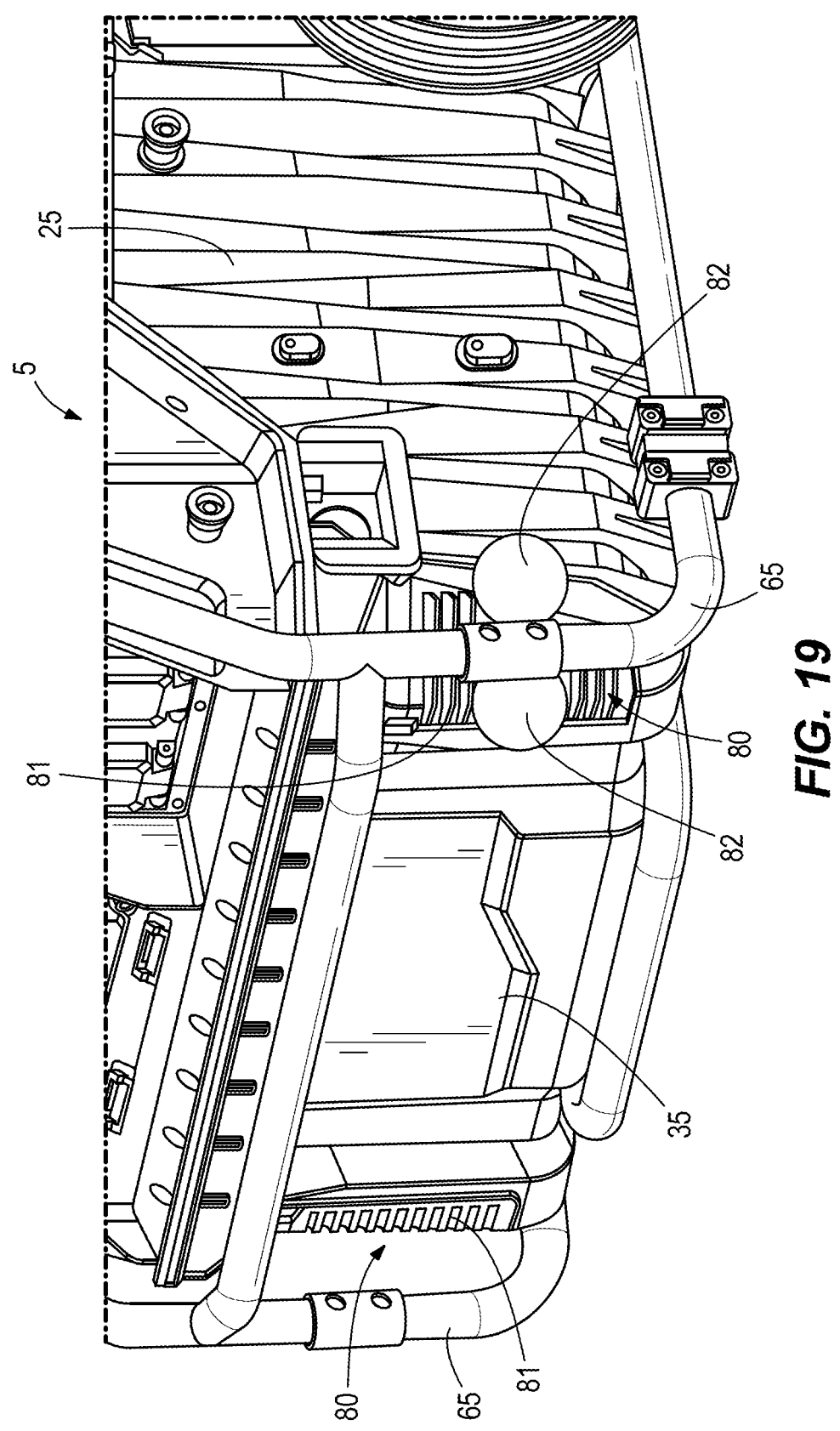
FIG. 19 is a perspective view of the portable power supply of FIG. 1.
Figure 20:
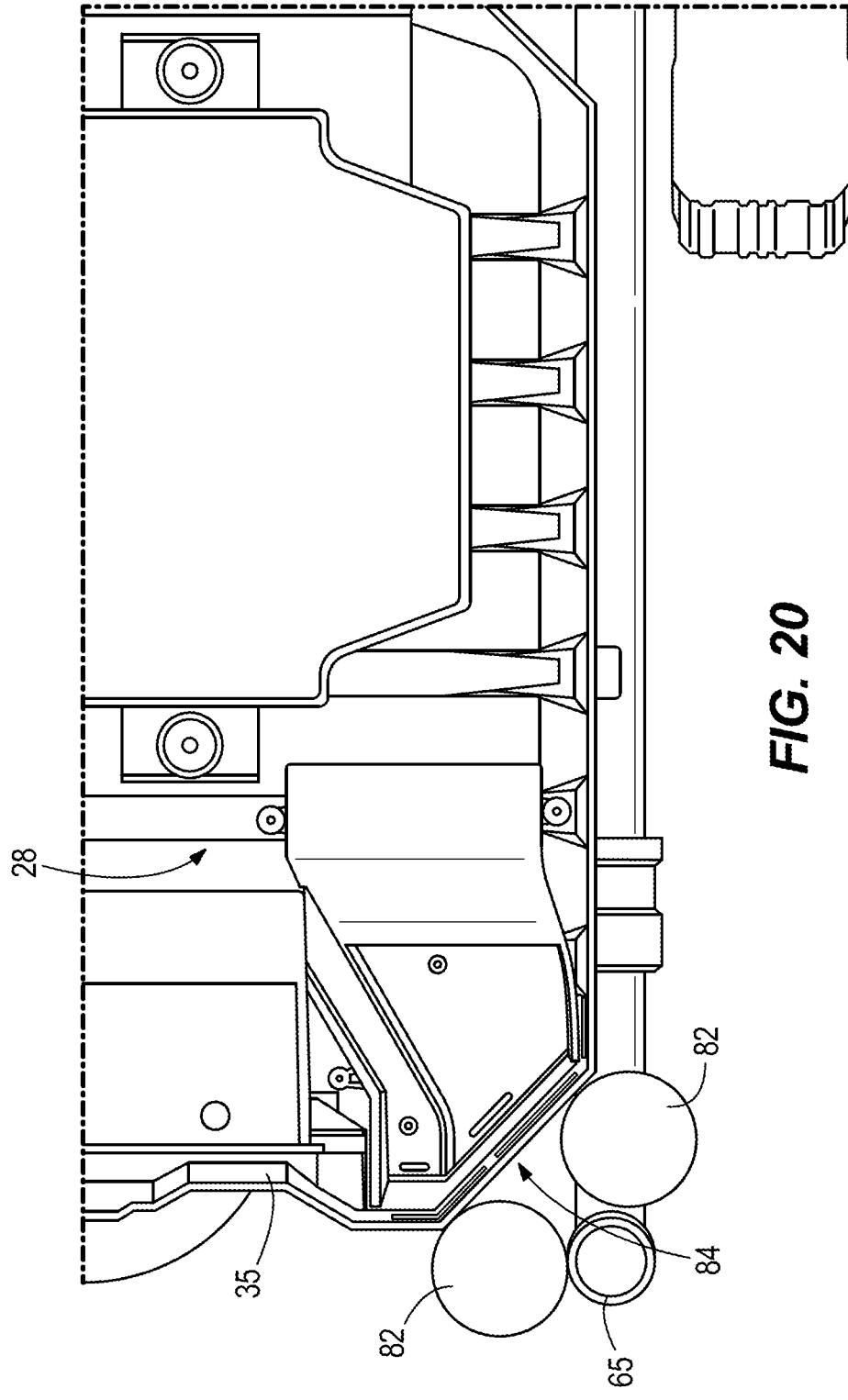
FIG. 20 is a side section view of the portable power supply of FIG. 1.

As illustrated in FIGS. 19-20, the portion of the frame 65 covering the bottom of the portable power supply 5 is advantageously positioned adjacent vents 80 that are defined in the housing 25 of the portable power supply 5. In the illustrated embodiment, the housing 25 includes louvers 81 provided at corners of the lower portion 35 of the housing 25. The louvers 81 define the vents 80. The louvers 81 may be structurally weaker, and therefore, more prone to fracture, than the rest of the housing 25. The vents 80 are configured to release warm, or heated, air from within the cavity 28 of FIG. 1. The frame 65 is positioned such that the frame 65 at least partially blocks external objects (e.g., a ball 82 as shown in FIG. 19-20) from directly hitting the louvers 81. In some embodiments, the frame 65 may be positioned at a distance from the louvers 81. That is, the frame 65 may be positioned such that the frame 65 does not directly touch the louvers 81. In absence of the frame 65, the ball 82, or another similar object, may directly hit the louvers 81, thereby fracturing the louvers 81. Therefore, the bottom portion of the frame 65 increases protection and durability of the louvers 81, and thus, the vents 80.

Additionally, with reference to FIG. 20, weld lines (e.g., knit lines) 84 for the housing 25 are advantageously positioned adjacent to and under cover of the bottom portion of the frame 65. The weld lines 84 extend in a direction transverse to the opening of at least one corresponding vent 80. As such, each weld line 84 may intersect at least one corresponding louver 81. The weld lines 84 have relatively lower material strength in a plastic mold than other areas of the plastic mold such that the weld lines 84 have a higher risk of fracture. By placing the weld lines 84 under cover of the frame 65, the risk of fracture is reduced, thereby increasing durability and longevity of the portable power supply 5. While the frame 65 covers the vents 80 and the weld lines 84 on the lower portion 35 of the portable power supply 5 in FIGS. 19-20, the frame 65 may additionally cover vents 80 and weld lines 84 positioned elsewhere on the portable power supply 5.

With reference to FIG. 2, the lower portion 35 of the housing 25 in the present embodiment is formed of a solid material such as, but not limited to, a plastic (e.g., a polymer). In some embodiments, the lower portion 35 may be formed of a different material. The lower portion 35 includes a plurality of exterior channels 85 positioned between a plurality of exterior ridges 90. At least one of the plurality of bars 70 (e.g. a portion of the frame 65) is positioned within a corresponding one of the plurality of exterior channels 85. The handle portion 75 is positioned adjacent the lower portion 35 in the illustrated embodiment. In other embodiments, the lower portion 35 may not include the plurality of exterior channels 85 and/or the plurality of exterior ridges 90. In further embodiments, the frame 65 may not include a portion that is positioned within a corresponding one of the plurality of exterior channels 85. In yet further embodiments, the handle portion 75 may be positioned elsewhere on the portable power supply 5.

Figures 3, 4:
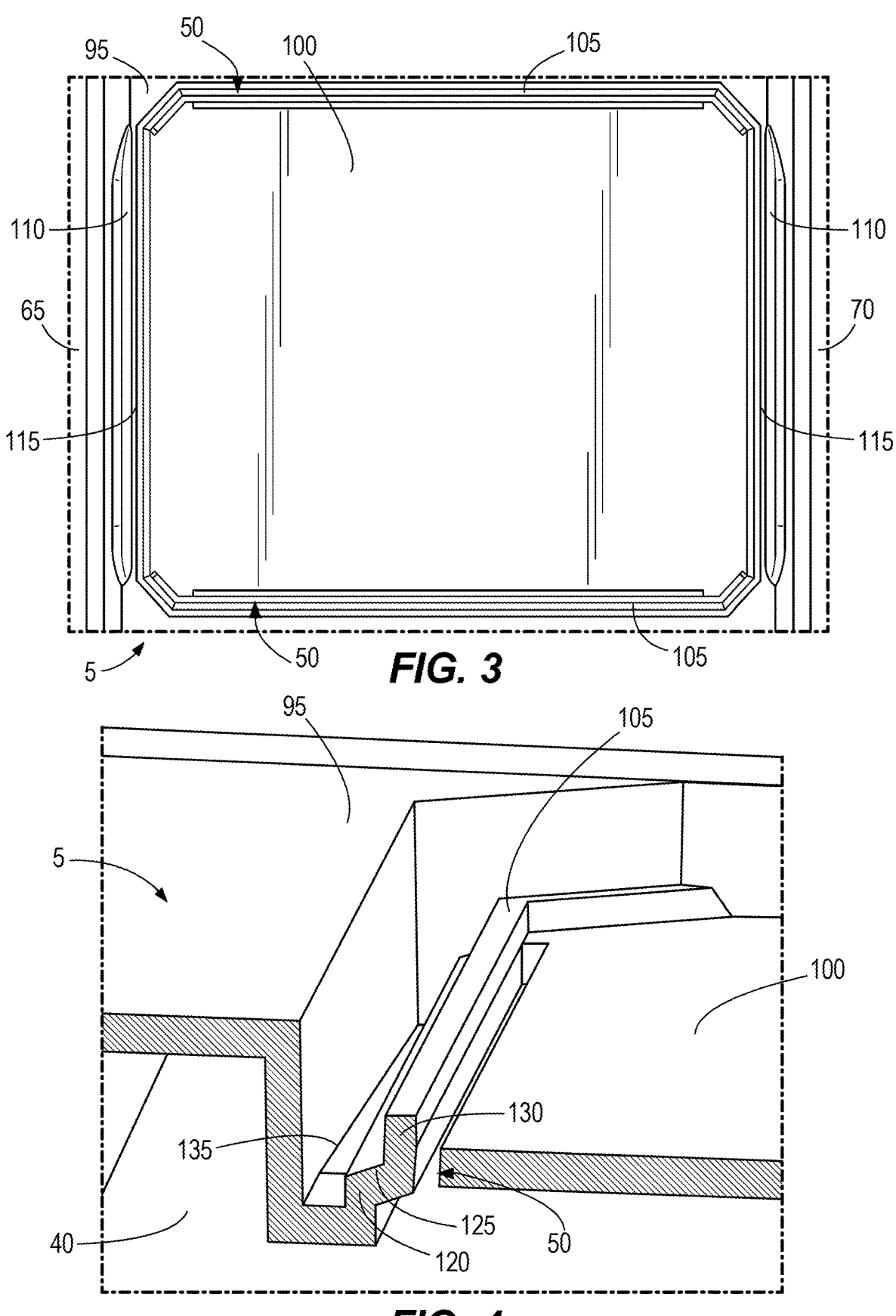
FIG. 3 is a top view of the portable power supply of FIG. 2.
FIG. 4 is a perspective view of a section "A" of the portable power supply of FIG. 1 with the attachment missing.

With reference to FIGS. 2-4, in the illustrated embodiment, the upper portion 40 of the housing 25 is formed of a solid material such as, but not limited to, a plastic. The upper portion 40 is configured to couple with and lie upon the lower portion 35. The user interface 55 is provided on the upper portion 40. In some embodiments, the user interface 55 may be positioned elsewhere on the portable power supply 5. A surface 95 (i.e., a top surface) of the upper portion 40 includes an attachment receiving portion 100. The attachment receiving portion 100 has a generally square shape and includes a first set of walls 105 and a second set of walls 110 that define a plurality of drainage openings 115. Each of the first set of walls 105 includes a first vertical portion 120, a sloped portion 125 and a second vertical portion 130. Each of the first set of walls 105 is positioned opposite the other of the first set of walls 105. Each of the second set of walls 110 is positioned opposite the other of the second set of walls 110. In the illustrated embodiment, the first set of walls 105 includes two walls, and the second set of walls 110 includes two walls such that the attachment receiving portion 100 is formed in the shape of a square. As such, each of the first set of walls 105 is adjacent to the two walls of second set of walls 110, and each of the second set of walls 110 is adjacent to the two walls of the first set of walls 105. In other embodiments, the attachment receiving portion 100 may be positioned elsewhere on the portable power supply 5. In further embodiments, the attachment receiving portion 100 may be formed in a generally different shape than a square such that the attachment receiving portion 100 includes more, fewer, or the same number of walls. In still further embodiments, the attachment receiving portion 100 may not have any walls. In any of the embodiments disclosed above, the lower portion 35 and the upper portion 40 may form one continuous structure.

Returning reference to FIGS. 1-2, in the illustrated embodiment, the plurality of air inlets 45 is positioned at and defined in a bottom of the lower portion 35 and is in fluid communication with the cavity 28. In other embodiments, the plurality of air inlets 45 may be positioned elsewhere on the portable power supply 5 such as on a side of the portable power supply 5. The plurality of air inlets 45 is configured to permit airflow to enter the cavity 28. The airflow entering the plurality of air inlets 45 is relatively cooler in temperature than the air throughout the cavity 28. The entering airflow may then interact with the battery 10, the charger 15, and the inverter 20 to cool the battery 10, the charger 15, and the inverter 20. In the illustrated embodiment, at least one of the plurality of air inlets 45 may also be configured as a liquid drain opening of the portable power supply 5. That is, the air inlets 45 may be configured to receive condensation produced within the cavity 28 of the portable power supply 5 and further configured to provide an outlet for said condensation to exit the cavity 28 of the portable power supply 5.

With reference to FIGS. 3-4, the plurality of air outlets 50 is positioned at and defined in the upper portion 40 of the portable power supply 5. The plurality of air outlets 50 is in fluid communication with the cavity 28 (FIG. 1) and the plurality of air inlets 45. In the illustrated embodiment, the plurality of air outlets 50 is positioned adjacent to and is partially formed in the first set of walls 105. The plurality of air outlets 50 defines an outlet axis A1 that extends through the plurality of air outlets 50. An opening to each of the plurality of air outlets 50 faces upwardly. That is, the opening to each of the plurality of air outlets 50 is defined in the top surface 95 of the upper portion 40 and faces away from the upper portion 40. The upper portion 40 further includes a drainage trough 135 that is formed in the upper portion 40 of the housing 25 such that the first set of walls 105 is positioned between the drainage trough 135 and the plurality of air outlets 50. The drainage trough 135 extends along at least a portion of the perimeter of the upper portion 40 of the housing. The drainage trough 135 is in fluid communication with the second set of walls 110. More specifically, the drainage trough 135 is in fluid communication with the plurality of drainage openings 115. The drainage trough 135 is sloped such that portions of the drainage trough 135 closer to the second set of walls 110, and thus closer to the plurality of drainage openings 115, are relatively lower than portions of the drainage trough 135 that are located further from the second set of walls 110, and thus further from the plurality of drainage openings 115.

In some embodiments, the plurality of air outlets 50 may be positioned elsewhere in the upper portion 40. In other embodiments, the upper portion 40 may not include a drainage trough 135 or the drainage trough 135 may have other configurations than the sloped configuration of the illustrated embodiment. In even further embodiments. The drainage trough 135 may extend in different orientations and directions than those of the illustrated embodiment.

With reference to FIG. 2, in the illustrated embodiment, the user interface 55 includes a plurality of user operation screens 140. The user operation screens 140 may supply information to a user such as, but not limited to, battery life of the portable power supply 5, internal temperature of the portable power supply 5, and/or power output of the portable power supply 5. The user interface 55 may further be configured to allow a user to switch the portable power supply 5 on and off. The user interface 55 may further be configured to allow an external powering means to engage with the charger 15. That is, the user interface 55 may include a port that is configured to receive an external powering means. In the illustrated embodiment, the user interface 55 is positioned on a surface of the upper portion 40 that is directly above the handle portion 75.

In reference to FIGS. 5-8, the attachment 60 is configured to couple to the portable power supply 5 at the attachment receiving portion 100. A plurality of fasteners 145 are configured to secure the attachment 60 to the portable power supply 5. In the illustrated embodiment, the fasteners 145 extend from a position within the upper portion 40 of the housing 25, through the attachment receiving portion 100, and into a plurality of fastener receiving holes 150 formed in the attachment 60. Stated another way, the plurality of fasteners 145 extend upwardly through the attachment receiving portion 100 and into the plurality of fasteners receiving holes 150 in the attachment 60. As such, the attachment 60 is coupled to the portable power supply 5 such that the plurality of fasteners 145 is not accessible to a user from an exterior location of the portable power supply 5. When coupled, the attachment 60 substantially covers the attachment receiving portion 100. In the present embodiment, the fasteners 145 are screws. In other embodiments, the attachment 60 may be coupled to the attachment receiving portion 100 by a different fastening means such that the fasteners 145 are accessible to a user.

Figure 5:
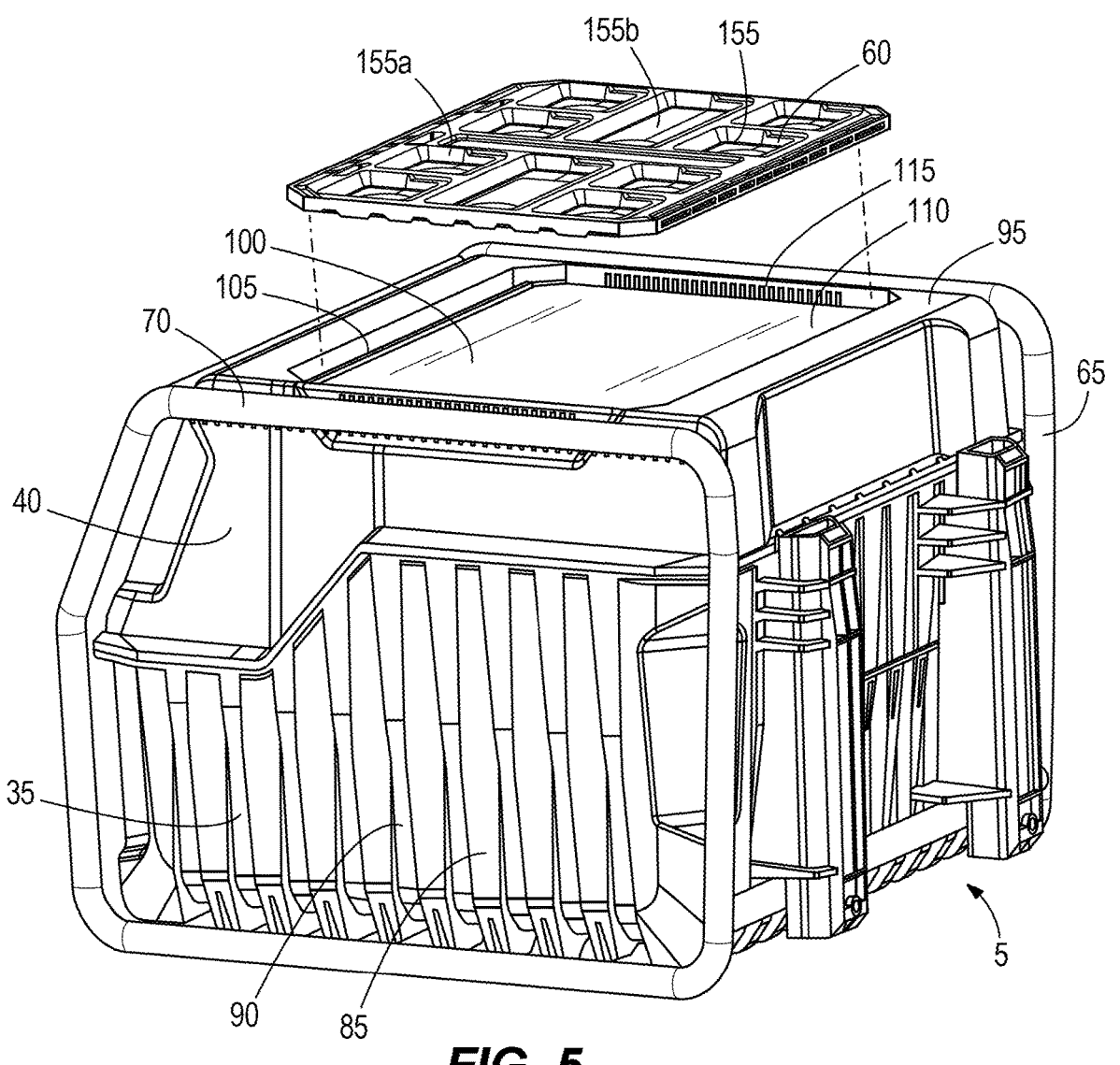
FIG. 5 is an exploded perspective view of the portable power supply of FIG. 1.
Figure 6:
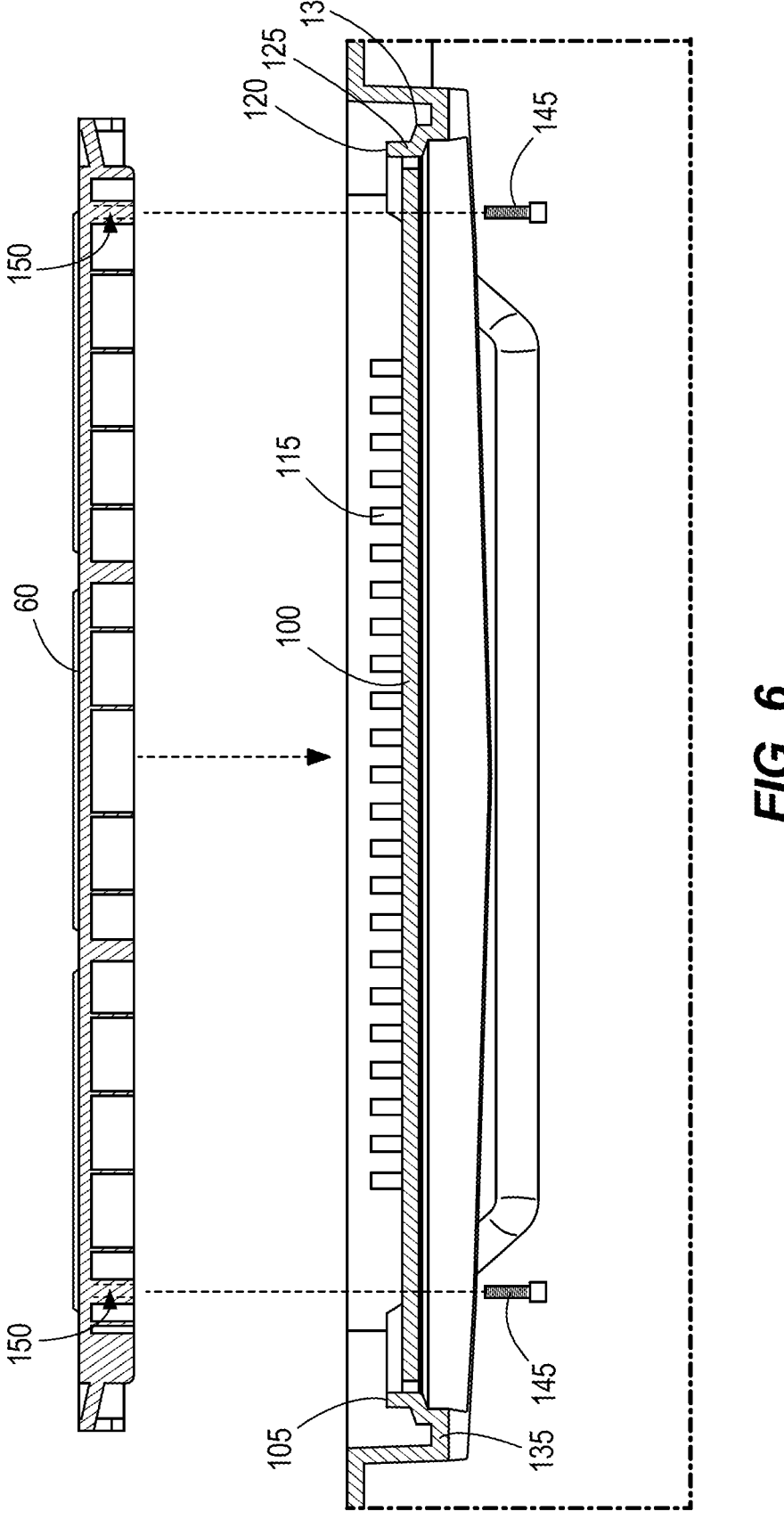
FIG. 6 is an enhanced side view of the portable power supply of FIG. 5
Figure 7:
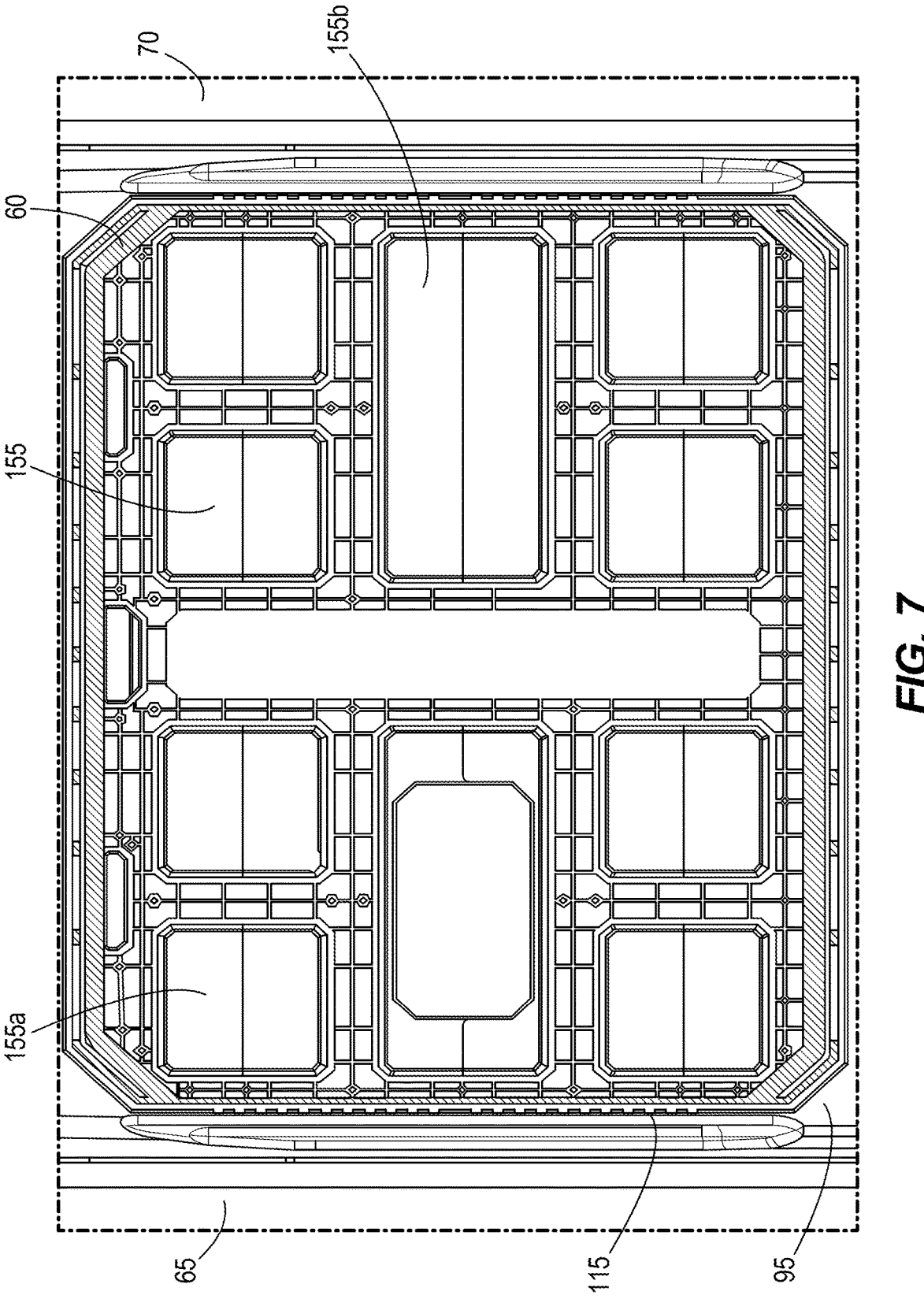
FIG. 7 is a top view of the portable power supply of FIG. 1.

With reference to FIGS. 5 and 7, the attachment 60 includes at least one coupling interface 155 formed on a surface of the attachment 60 that is opposite the upper portion 40. In the illustrated embodiment, the attachment 60 includes ten coupling interfaces 155. More specifically, the attachment 60 includes eight roughly square shaped coupling interfaces 155a and two roughly rectangular coupling interfaces 155b. In other embodiments, the attachment 60 may include more or fewer coupling interfaces 155 of differing shapes and sizes. The inverter 20 (FIG. 1) is configured to transmit an alternating current to the attachment 60 such that the attachment 60 is configured to supply power at the coupling interfaces 155. The attachment 60 may be configured to supply power to one or multiple of the coupling interfaces 155 at a time.

Figures 8, 9:
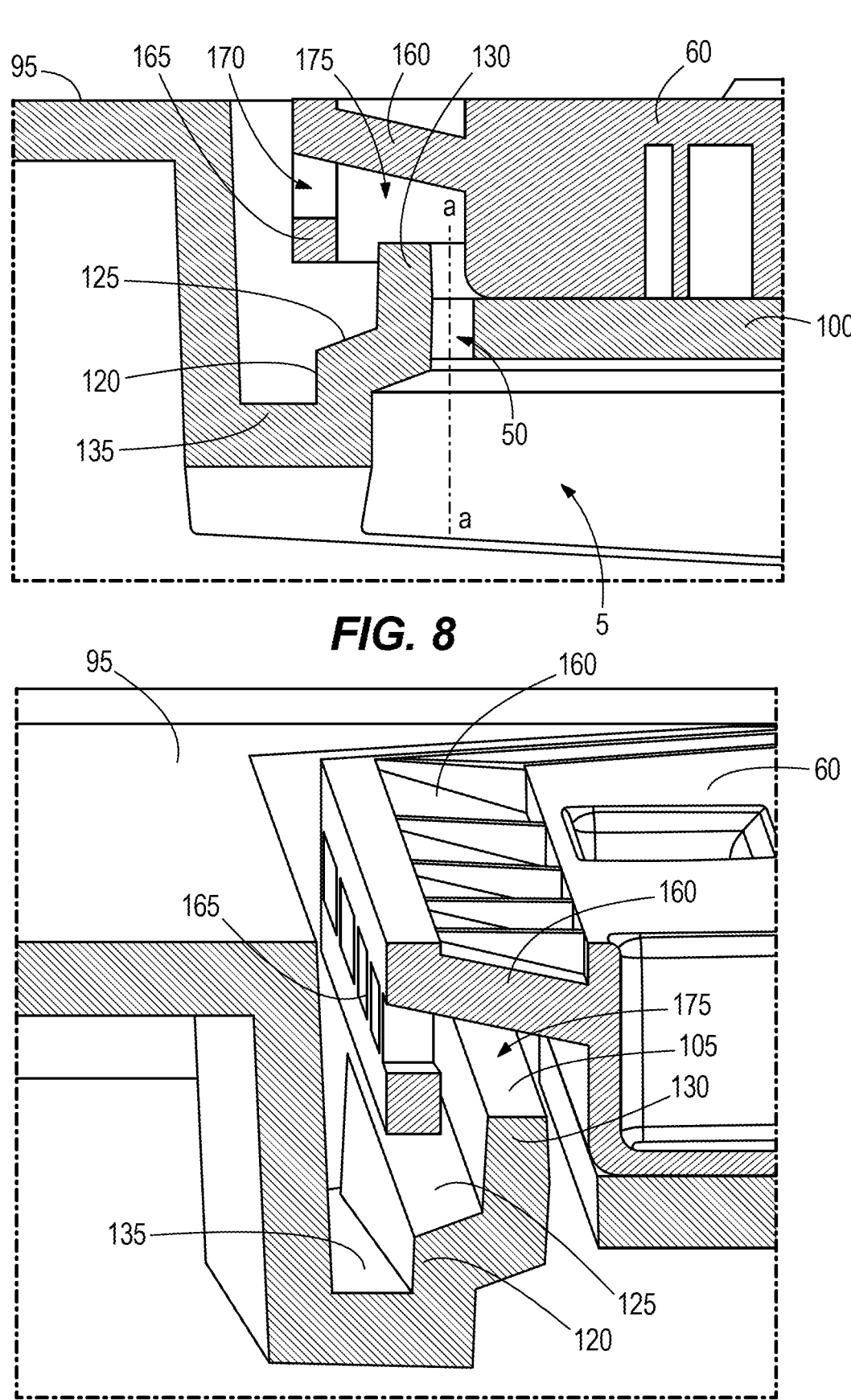
FIG. 8 is a side view of the section "A" of the portable power supply of FIG. 1.
FIG. 9 is a perspective view of the section "A" of the portable power supply of FIG. 1.

Referring to FIGS. 8-9, the attachment 60 of the illustrated embodiment further includes a wall 160 that is provided around the outer periphery of the attachment 60. The wall 160 extends transversely to the outlet axis A1 such that the wall 160 is configured to redirect airflow flowing through the plurality of air outlets 50. The attachment 60 further includes a downwardly depending sidewall 165 that extends from the wall 160. The downwardly depending sidewall 165 defines a plurality of attachment air outlets 170. When the attachment 60 is coupled to the upper portion 40 of the housing 25, the downwardly depending sidewall 165 is positioned above the first vertical portion 120 of the first set of walls 105 of the upper portion 40. As such, a gap 175 is defined between an inside surface of each of the downwardly depending sidewalls 165, the wall 160, the first vertical portion 120 of the first set of walls 105, the sloped portion 125 of the first set of walls 105, and the second vertical portion 130 of the first set of walls 105 such that the gap 175 is in fluid communication with the drainage trough 135. In other embodiments, the attachment 60 may include components with different shapes, structures, and sizes oriented at different angles than that of the illustrated embodiment.

Returning reference to FIG. 1, in operation of the portable power supply 5, the portable power supply 5 may be cooled when relatively cooler ambient air enters the portable power supply 5 through the plurality of air inlets 45. The relatively cool air rises through the cavity 28, cooling the battery 10, the charger 15 and the inverter 20. Warm air exhausted, or released, by any one of the battery 10, the charger 15, and the inverter 20 may rise to the plurality of air outlets 50. With reference to FIGS. 8-9, the wall 160 on the attachment 60 redirects the flow of warm air to the downwardly depending sidewall 165. The flow of warm air may then exit the portable power supply 5 via the plurality of attachment outlets 170, thereby lowering the internal temperature of, or cooling, the portable power supply 5. Any moisture (e.g. condensed water) formed within the cavity 28 (FIG. 1) may exit the cavity 28 (FIG. 1) through the at least one of the plurality of air inlets (e.g. liquid drain openings) 45. Further, any moisture (e.g. condensed water) formed in the plurality of air outlets 50 from the flow of warm air as the flow of warm air is exhausted from the portable power supply 5 is directed to the drainage trough 135 by the downwardly depending sidewall 165, the second vertical portion 130, the sloped portion 125, and the first vertical portion 120. The moisture may then travel along the drainage trough 135 until the moisture reaches the second set of walls 110, and more specifically, the plurality of drainage openings 115, to exit the portable power supply 5. Airflow and moisture may enter, pass through, and/or exit from the portable power supply 5 with respect to any alternative features of the previously disclosed embodiments. In further embodiments, the portable power supply 5 may include fans (not shown) for active airflow cooling through vents (not shown). In such embodiments, the portable power supply 5 may be cooled entirely by passive airflow as described above, entirely by active airflow brought about by the fans, or any combination of passive airflow and active airflow.

Figure 10:
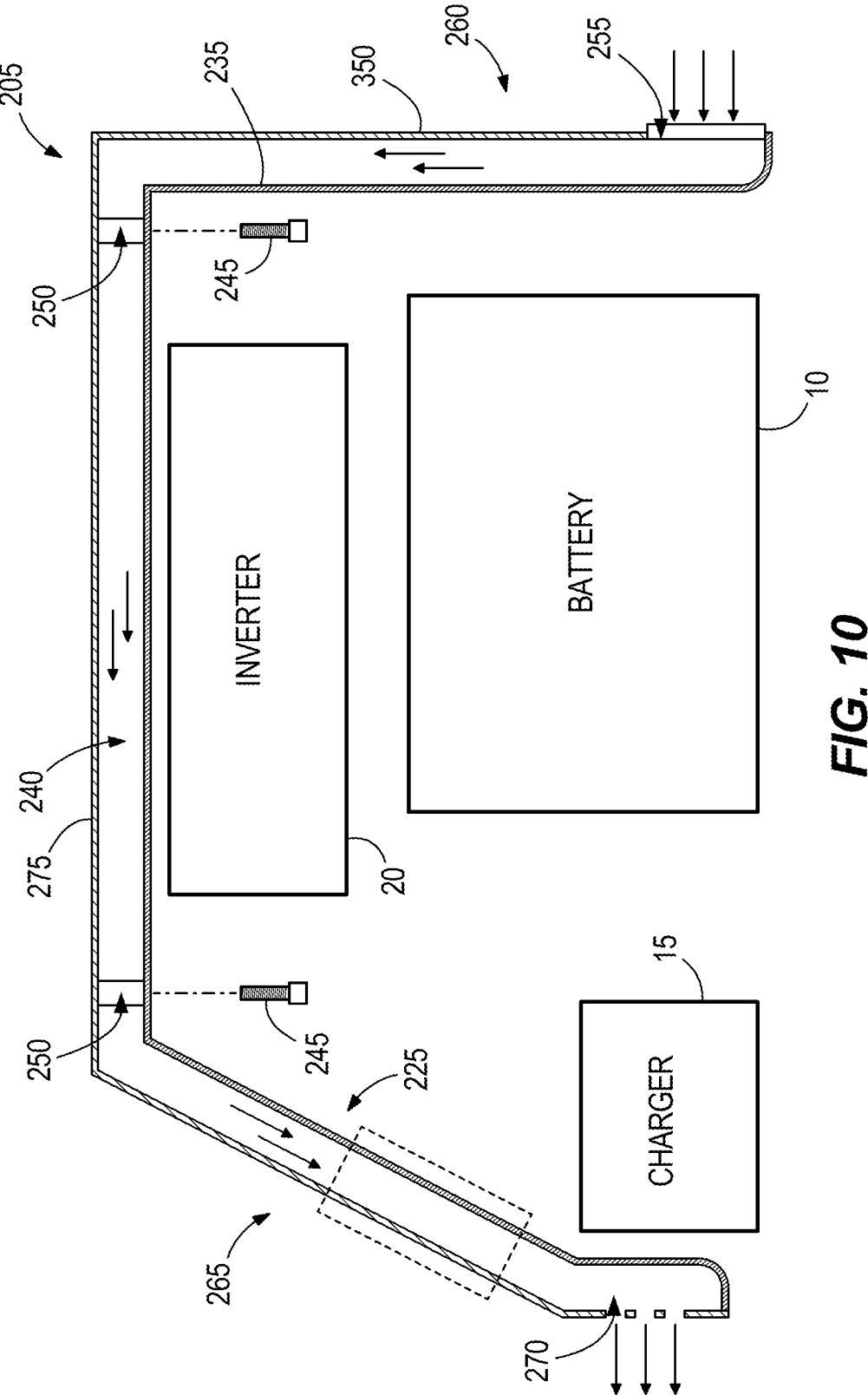
FIG. 10 is a cross sectional view of a portable power supply.
Figure 11:
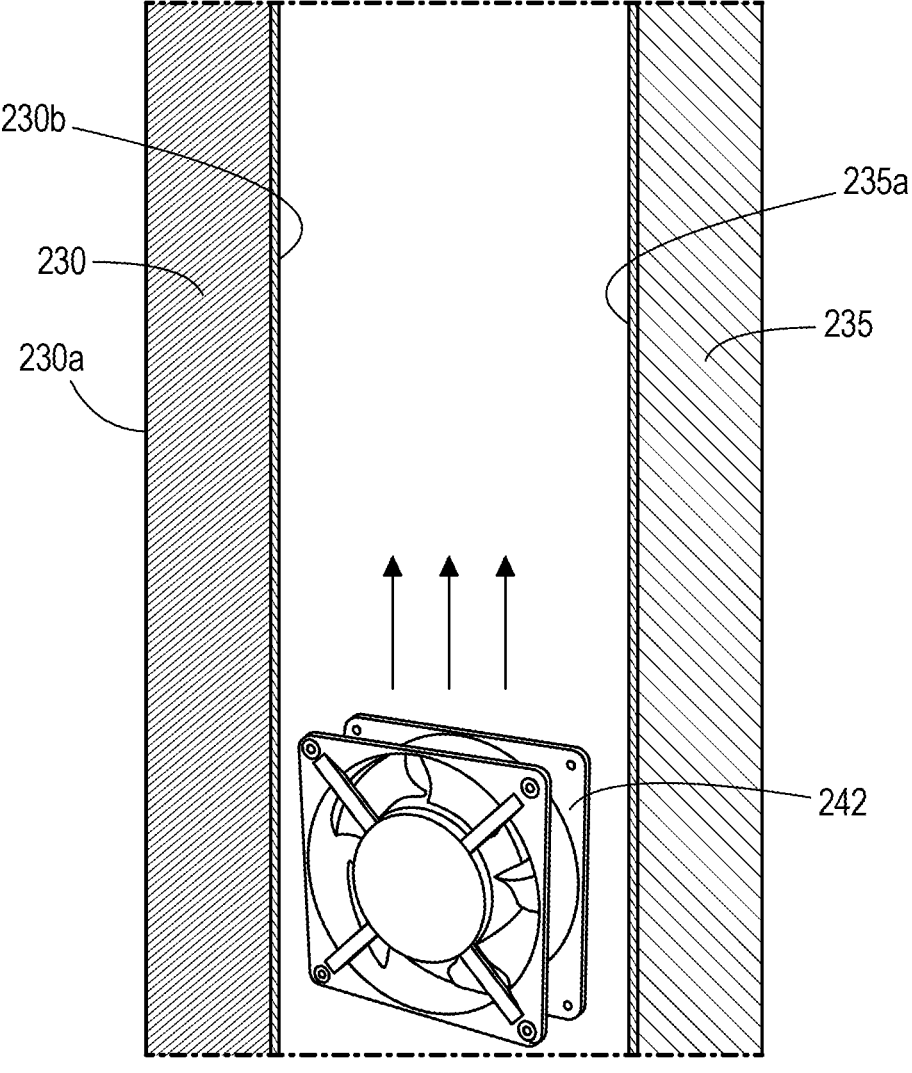
FIG. 11 is a section view of the cross-sectional view of the portable power supply of FIG. 10.

FIGS. 10-11 illustrate a portable power supply 205 according to another embodiment of the disclosure. The portable power supply 205 of FIGS. 10-11 may be substantially similar to the portable power supply 5 of FIGS. 1-9 except for the differences described below. As illustrated in FIG. 10, the portable power supply 205 includes a housing 225 having an outer wall 230, an inner wall 235, and an airflow passage 240 defined between the outer wall 230 and the inner wall 235 such that a fan 242 is coupled to the housing 225. The fan 242 is configured to induce airflow through the airflow passage 240. In the illustrated embodiment, the fan 242 is positioned outside of and is coupled to the housing 225. In other embodiments, the fan 242 may be disposed between the outer wall 230 and the inner wall 235.

FIG. 10 displays a cross-section of the portable power supply 205. In the illustrated embodiment, a plurality of fasteners 245 couples the outer wall 230 to the inner wall 235 such that the outer wall 230 is adjacent to but does not touch the inner wall 235. Each of the plurality of fasteners 245 extends through a corresponding one of a plurality of buffers 250 that extend between the outer wall 230 and the inner wall 235. The portable power supply 205 includes an inlet 255 to the airflow passage 240 on a first side 260 of the portable power supply 205, and an outlet 270 of the airflow passage 240 positioned on a second side 265 that is opposite the first side 260. In other words, the inlet 255 of the airflow passage 240 is opposite the outlet 270 of the airflow passage 240 such that the direction of airflow flowing into the portable power supply 205 is parallel to the direction of airflow flowing out of the portable power supply 205. The airflow passage 240 is disposed in a majority of a perimeter of the cross-section of the portable power supply 205. In other words, the airflow passage 240 travels through at least half, or 50%, of the perimeter of the cross-section of the portable power supply 205. Airflow enters through the inlet 255 of the airflow passage 240 positioned on the first side 260 of the portable power supply 205 and travels up to a top side 275 of the portable power supply 205. The airflow then travels across the top side 275 from the first side 260 to the second side 265 of the portable power supply 205 and down to the outlet 270 of the airflow passage 240 such that the airflow passage 240 covers roughly 75% of the perimeter of the cross-section of the portable power supply 205.

In some embodiments, the outer wall 230 may couple to the inner wall 235 by another coupling means such as, but not limited to, welding. In other embodiments, the outer wall 230 and the inner wall 235 may be one singular entity such that a second cavity is defined within, the airflow passage 240 travelling through the second cavity. In further embodiments, the inlet 255 of the airflow passage 240 may be positioned elsewhere on the portable power supply 205 such as, but not limited to, a top or bottom in which airflow entering the inlet 255 of the airflow passage 240 may or may not be parallel to airflow exiting the outlet 270 of the airflow passage 240. In even further embodiments, a fan 242 (FIG. 11) may be inside or outside of the portable power supply 205 and configured to induce airflow through an airflow passage 240.

With reference to FIG. 11, the outer wall 230 has an outer surface 230*a* that faces away from the portable power supply 205 and an inner surface 230*b* that faces inwards towards the portable power supply 205. The outer wall 230 is made of a plastic material having a low thermal conductivity and a low thermal diffusivity. The outer surface 230*a* has a high total solar reflectance. A high total solar reflectance results in the outer surface 230*a* having a low absorptivity to emissivity ratio. Alternatively, the outer surface 230*a* may be opaque in some embodiments. In such embodiments, a high total reflectance results in the outer surface 230*a* having a low ratio of the difference between one and reflectivity (i.e., one minus reflectivity) to emissivity. The inner surface 230*b* has a low emissivity.

The inner wall 235 has an outer surface 235*a* that faces away from the portable power supply 205 and towards the outer wall 230. The inner wall 235 is made of a plastic material having a low thermal conductivity and a low thermal diffusivity. In some embodiments, the outer surface 235*a* has a high total solar reflectance. A high total solar reflectance results in the outer surface 235*a* having a low absorptivity to emissivity ratio. In other embodiments, the outer surface 235*a* is not directly exposed to solar irradiation, and therefore may not require a high total solar reflectance. Alternatively, the outer surface 235*a* may be opaque in some embodiments. In such embodiments, a high total reflectance results in the outer surface 235*a* having a low ratio of the difference between one and reflectivity (i.e., one minus reflectivity) to emissivity. In some embodiments, the outer wall 230 and the inner wall 235 may be made of the same plastic material such that the outer wall 230 and the inner wall 235 have the same relatively low thermal conductivity and thermal diffusivity. Further, the outer surface 230*a* of the outer wall 230 and the outer surface 235*a* of the inner wall 235 may have the same surface properties such that the two outer surfaces 230*a*, 235*a* have the same relatively high total reflectance. In other embodiments, the outer wall 230 and the inner wall 235 may be formed of different plastic materials such that one of the outer wall 230 and the inner wall 235 has a relatively higher one or both of thermal conductivity and thermal diffusivity than the other of the outer wall 230 and the inner wall 235. In such embodiments, one of the outer surfaces 230*a*, 235*a* may have a relatively lower total solar reflectance than the other of the outer surfaces 230*a*, 235*a*.

Figure 12:
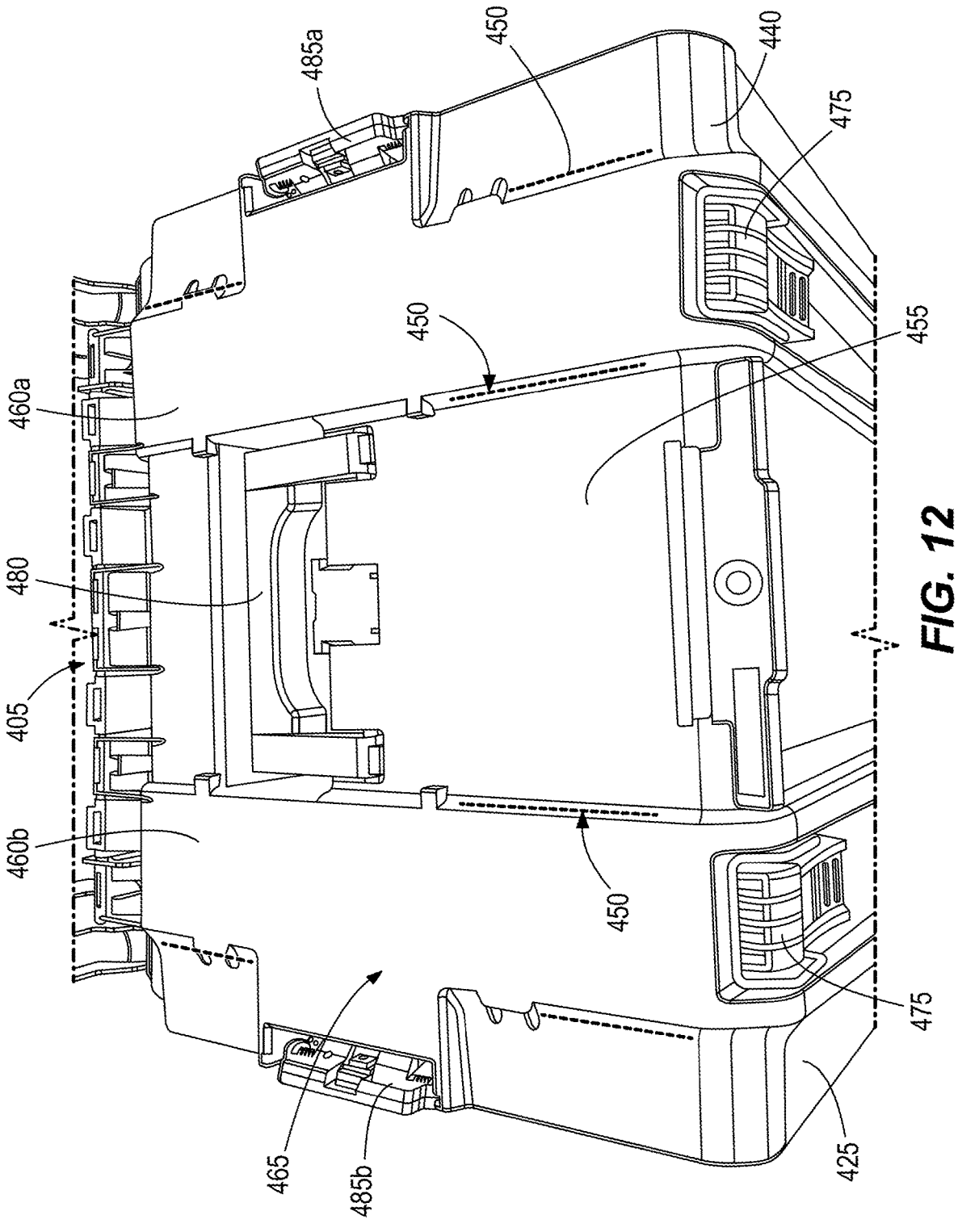
FIG. 12 is a top view of a portable power supply.
Figure 13:
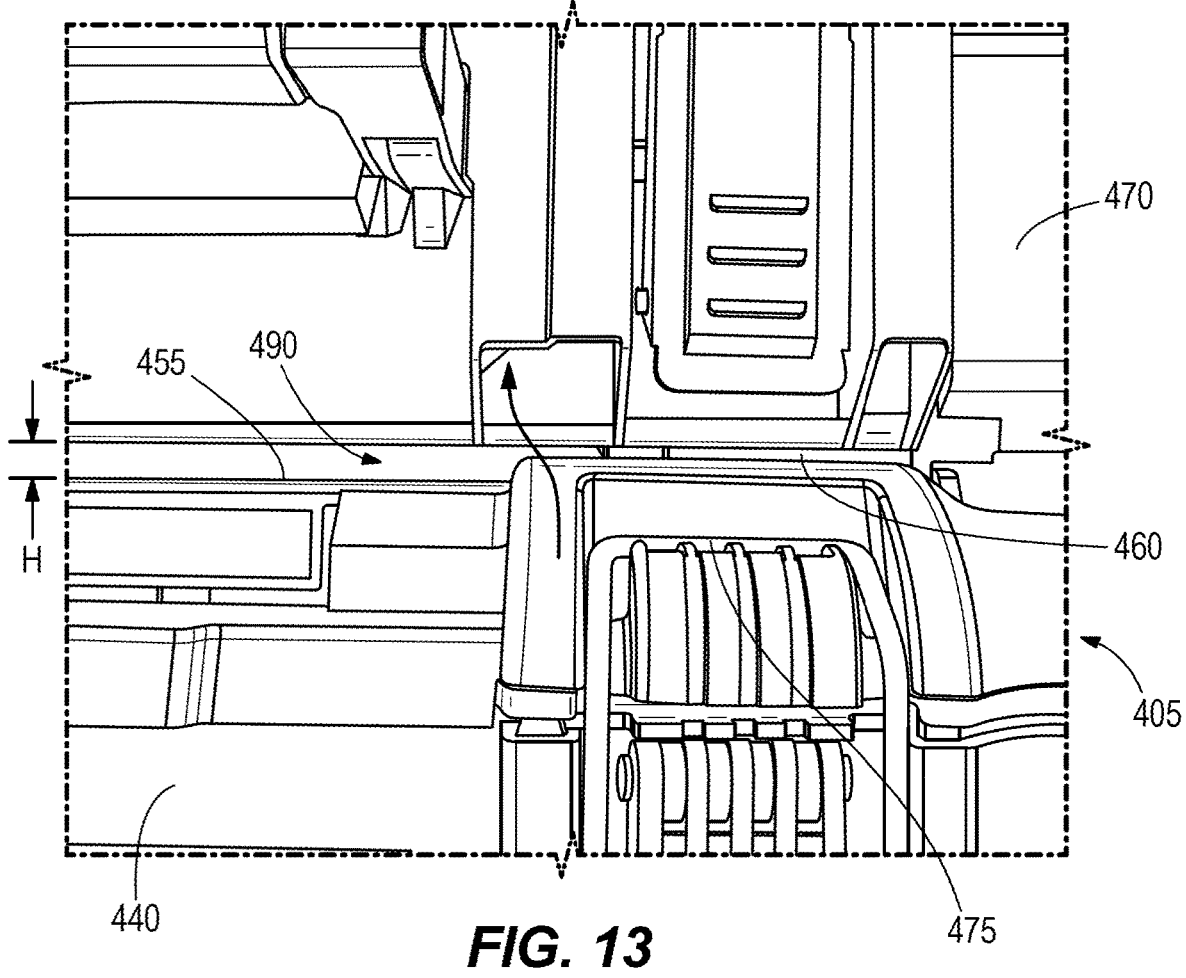
FIG. 13 is a section view of the portable power supply of FIG. 12.

FIGS. 12-17 illustrate a portable power supply 405 according to another embodiment of the disclosure. The portable power supply 405 may be substantially similar to the portable power supply 5 of FIGS. 1-9 and the portable power supply 205 of FIGS. 10-11 except for the differences described below. As illustrated in FIGS. 12 and 13, the portable power supply 405 includes a housing 425 having a plurality of air inlets, such as the air inlets 45 of FIG. 1, that are in fluid communication with a cavity, such as the cavity 28 of FIG. 1, although the air inlets and the cavity are not illustrated in FIG. 12. The housing 425 further includes a plurality of air outlets 450 in fluid communication with the cavity. The plurality of air outlets 450 is opened laterally between an upper surface 455 and a raised upper surface 460, both of which are positioned on an upper portion 440 of the housing 425. The raised upper surface 460 may be one of a multiple of raised upper surfaces 460. In the illustrated embodiment, there are two raised upper surfaces 460*a*, 460*b*. Some of the plurality of air outlets 450 may face outwardly from the center of the portable power supply 405. Another some of the plurality of air outlets 450 may face inwardly toward the center of the portable power supply 405.

Figure 15:
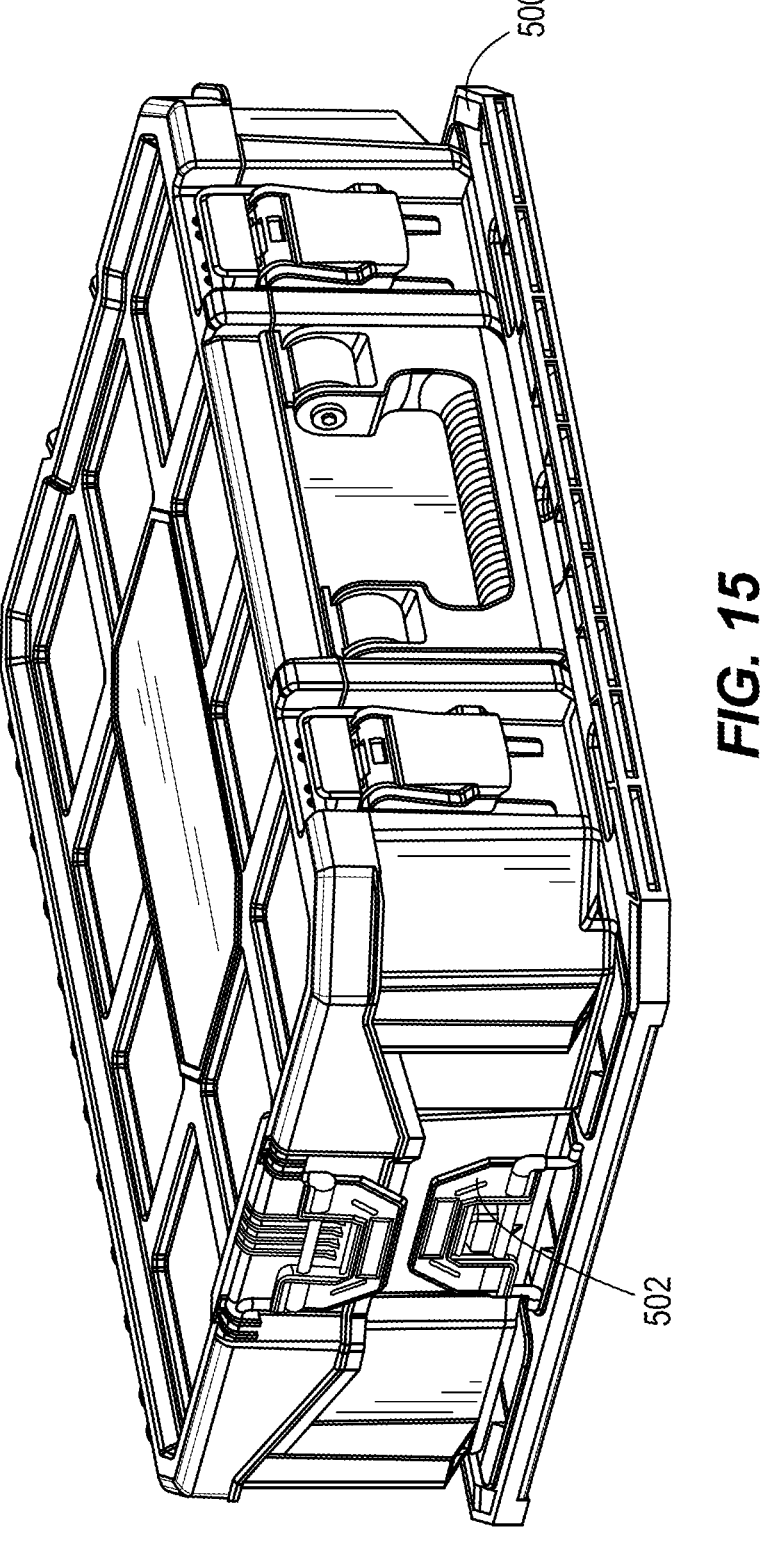
FIG. 15 is a perspective view of an attachment and a stackable interface of the portable power supply of FIG. 12.

With reference to FIGS. 12 and 15, the upper portion 440 includes an interface 465 configured to receive an attachment stacking interface 470. In the illustrated embodiment, the stacking interface 470 is a toolbox 502 having charging inlets. In other embodiments, the stacking interface 470 may be another chargeable structure. In the illustrated embodiment, the interface 465 includes the upper surface 455, the raised upper surfaces 460*a*, 460*b*, and a plurality of latches 475. The stacking interface 470 may fit on top of one or both of the upper surface 455 and the raised upper surfaces 460*a*, 460*b* and is secured in place by the plurality of latches 475. A handle 480 is disposed within the upper surface 455 between the two raised upper surfaces 460*a*, 460*b*. The stacking interface 470 covers the handle 480 when the stacking interface 470 is coupled to the portable power supply 405. The portable power supply 45 further includes supplementary handles 485*a*, 485*b* that are disposed on a corresponding side of the portable power supply 405 for use when the handle 480 is covered by the stacking interface 470.

With additional reference to FIG. 13, the stacking interface 470 lies on top of the raised upper surface 460 such that a space 490 exists between the stacking interface 470 and the upper surface 455 in the illustrated embodiment. The space 490 defines a height H which is equal to distance between the raised upper surfaces 460*a*, 460*b* and the upper surface 455. The plurality of air outlets 450 opens laterally such that airflow is redirected as the airflow flows through the portable power supply 405 similarly to the portable power supply 5 of FIGS. 1-9. More specifically, airflow is configured to enter the portable power supply 405 substantially similarly to the portable power supply 5 of FIGS. 1-9 and is configured to cool inner components of the portable power supply 405 (e.g., the battery 10, the charger 15, and the inverter 20 of FIG. 1). Warm air released by the inner components of the portable power supply 405 rises to the laterally opened plurality of air outlets 450 such that air rising vertically is redirected horizontally by the raised upper surface 460 and the stacking interface 470 to exit the plurality of air outlets 450 and cool the portable power supply 405.

Figure 14:
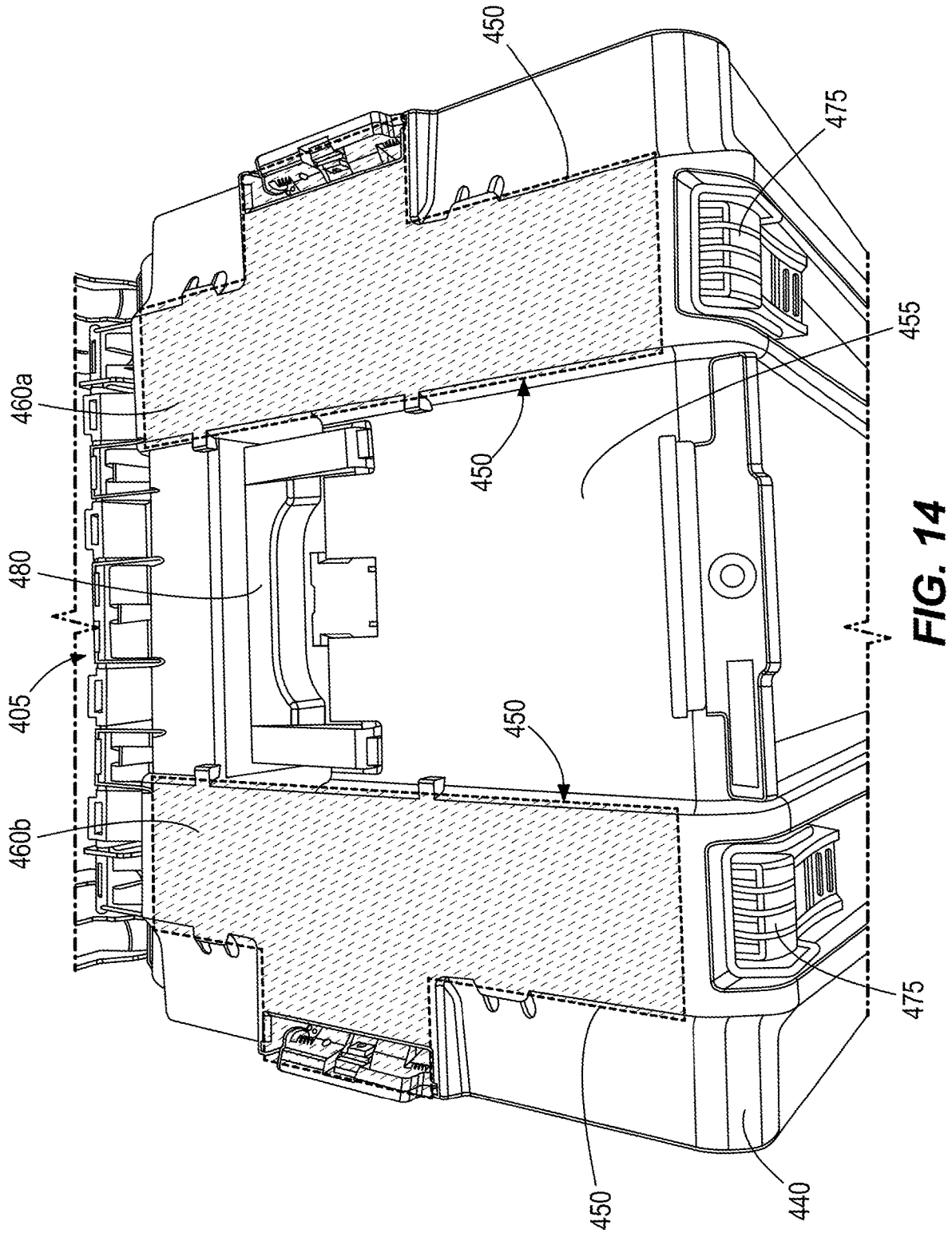
FIG. 14 is a top view of the portable power supply of FIG. 12.
Figure 16:
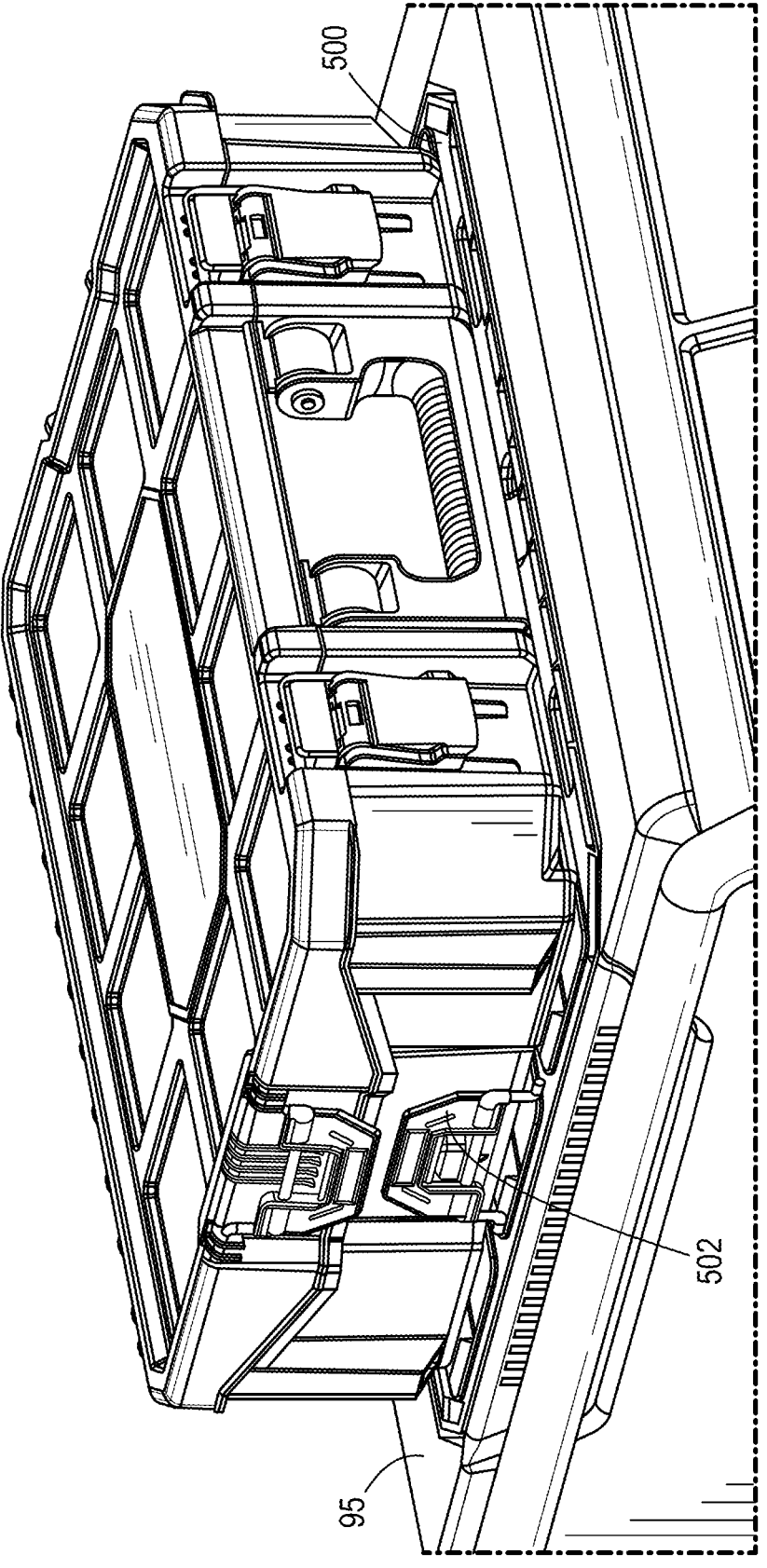
FIG. 16. is a perspective view of the attachment and the stackable interface of FIG. 15 and the portable power supply of FIG. 12.

In some embodiments, as illustrated in FIGS. 14 and 15, the portable power supply 405 is configured to receive an attachment 500 that is substantially similar to the attachment 60 of FIG. 5. The is attachment 500 is mountable to the raised upper surfaces 460a, 460b such that the plurality of air outlets 450 is opened laterally between the upper surface 455 and the attachment 500. As illustrated in FIGS. 15 and 16, the attachment 500 includes the plurality of latches 502 for coupling and securing the stacking interface 470. Although not shown in FIGS. 15 and 16, the attachment 500 of the illustrated embodiment includes a plurality of coupling interfaces that is substantially similar to the plurality of coupling interfaces 155 of FIG. 7. The plurality of coupling interfaces is positioned on a surface of the attachment 500 that is opposite, or faces away, from the upper portion 440. The plurality of coupling interfaces is configured to engage the stacking interface 470, or another similar structure, to provide electricity thereto.

Figures 17, 18:
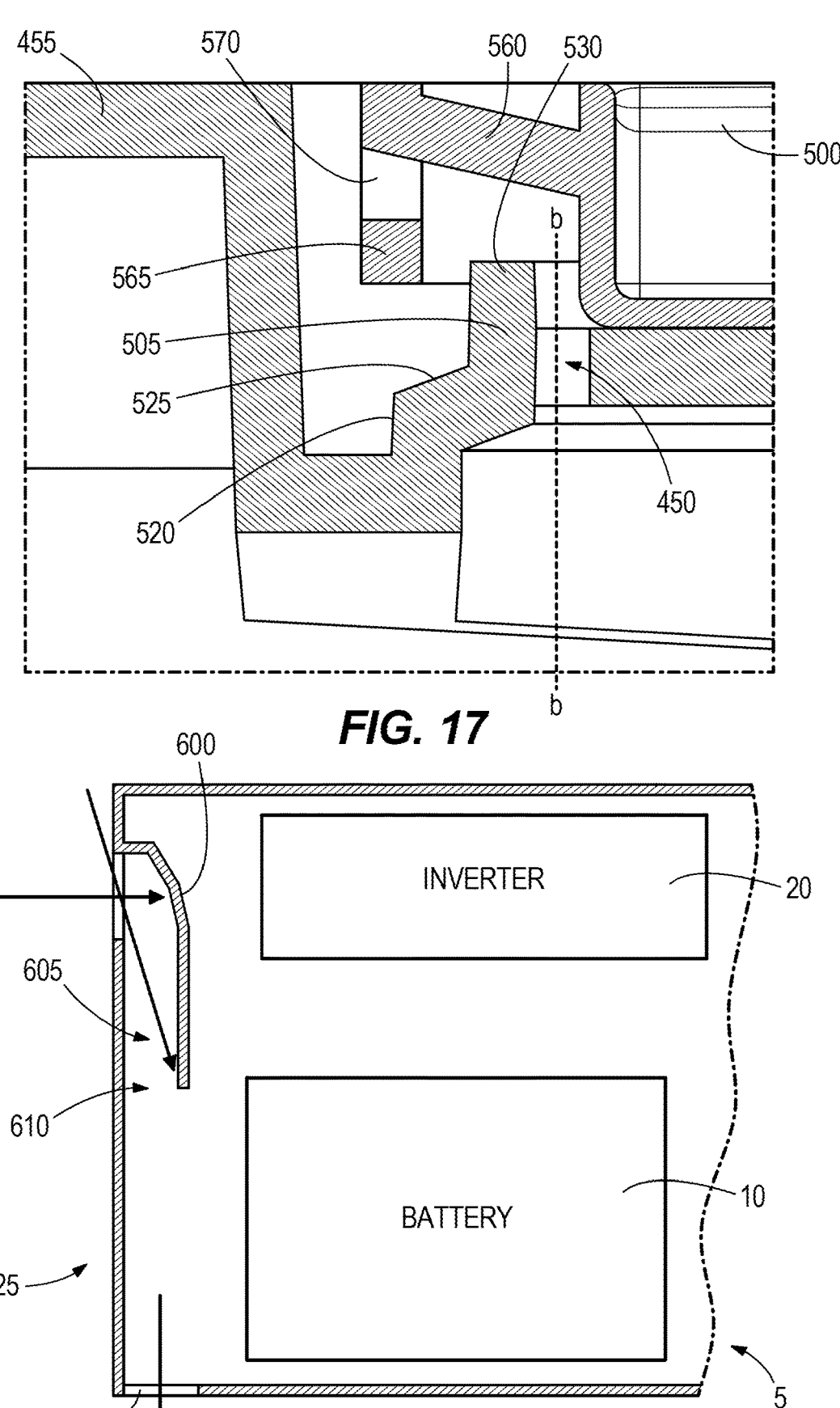
FIG. 17 is a section view of the portable power supply of FIG. 12.
FIG. 18 is a cross-sectional side view of the portable power supply of any of FIG. 1, FIG. 10, and FIG. 12.

FIG. 17 displays a section view of one of the plurality of air outlets 450. The upper surface 455 includes a first set of walls, or upwardly extending ridges, 505 positioned adjacent to the corresponding one of the plurality of air outlets 450. The upwardly extending ridges 505 include a first vertical portion 520, a sloped portion 525, and a second vertical portion 530. The attachment 500 includes an upper wall 560 angled relative to an axis, b, defined by and extending through the plurality air outlets 450 such that the upper wall 560 redirects airflow. A downwardly depending sidewall 565 extends from the upper wall 560 and includes a plurality of attachment outlets 570 through which airflow is configured to exit the portable power supply 405.

With reference to FIG. 18, any of the previously disclosed embodiments of the portable power supply 5, 205, 405 (FIGS. 1, 10, and 12) may include a deflector 600. Although each portable power supply 5, 205, 405 (FIGS. 1, 10, and 12) may include the deflector 600, for the sake of brevity, the deflector 600 is described just with respect to the portable power supply 5 of FIG. 1. The description of the deflector applies equally to the portable power supply 205, 405 of FIGS. 10 and 12. As illustrated in FIG. 18, the portable power supply 5 is disposed in the cavity 28 such that the deflector 600 and the upper portion 40 (FIG. 2) cooperate to define a duct 605. The duct 605 includes a downwardly opening portion 610 positioned over at least one of the plurality of air inlets 45. The duct 605 is configured to receive liquids from an exterior of the portable power supply 5 and direct the liquids along the deflector 600 to the downwardly opening portion 610. The liquid then travels downwardly, under the force of gravity, to at least one of the plurality of air inlets 45 aligned vertically with the downwardly opening portion 610. The at least one of the plurality of air inlets 45 then provides a drain opening for the liquid such that the liquid exits the portable power supply 5 through the at least one of the plurality of air inlets 45.

Each embodiment of the portable power supply 5, 205, 405 may be exposed to outdoor conditions such as, but not limited to, rain, dust, mud, and sun exposure. Therefore, the portable power supply 5, 205, 405 may be advantageously provided with features for protecting against said outdoor conditions.

In each embodiment of the portable power supply 5, 205, 405, the portable power supply 5, 205, 405 may include sealed subsystems 615, 620. For example, in the illustrated embodiment of FIGS. 21 and 22, the portable power supply 5, 205, 405 may include a battery subsystem 615 and a charger subsystem 620 that are provided with sealant to substantially seal the subsystems 615, 620 from the rest of the portable power supply 5, 205, 405. Sealing the subsystems 615, 620 may inhibit outdoor elements from entering and moving between subsystems 615, 620 of the portable power supply 5, 205, 405. The subsystems 615, 620 of the portable power supply 5, 205, 405 may be provided with any common form of sealant such as, but not limited to, water based latex sealant, acrylic sealant, and silicone sealant. As such, the sealant improves ingress protection without taking up excess space and may therefore inhibit environmental ingress without substantially increasing the size of the portable power supply 5, 205, 405. Additionally, providing sealant between subsystems 615, 620 of the portable power supply 5, 205, 405 may advantageously increase the thermal resistance for the portable power supply 5, 205, 405.

In another embodiment of the portable power supply 5, 205, 405, each subsystem 615, 620 of the portable power supply 5, 205, 405 (e.g., the battery, the charger, the inverter) may be fully rated according to a system-level Ingress Protection Code (i.e., IP Code) and/or Underwriter's Laboratories Rating. For example, the subsystems 615, 620 of the portable power supply 5, 205, 405 may be manufactured to have a solid IP Code of 6 and a liquid IP Code of 9k. At a solid IP Code of 6, the subsystems 615, 620 of the portable power supply 5, 205, 405 inhibit dust ingress for at least eight hours while in close contact with dust and other debris. At a liquid IP Code of 9k, the subsystems 615, 620 of the portable power supply 5, 205, 405 are able to withstand high pressure and high temperature water jets/sprays at a close range. By fully rating each of the subsystems 615, 620 of the portable power supply 5, 205, 405, the ingress protection is specifically defined for smaller systems which may improve ease of manufacturing. Fully rating each of the subsystems 615, 620 may also provide ingress protection that is better protected from external harm than when the subsystems 615, 620 are just sealed and not fully rated. That is, the housing 25 and the frame 65 may protect the subsystems 615, 620 against external harm. Therefore, said ingress protection may be less likely to be damaged or comprised than in embodiments of the portable power supply 5, 205, 405 than embodiments of the portable power supply 5, 205, 405 in which subsystems are just sealed.

Figure 21:
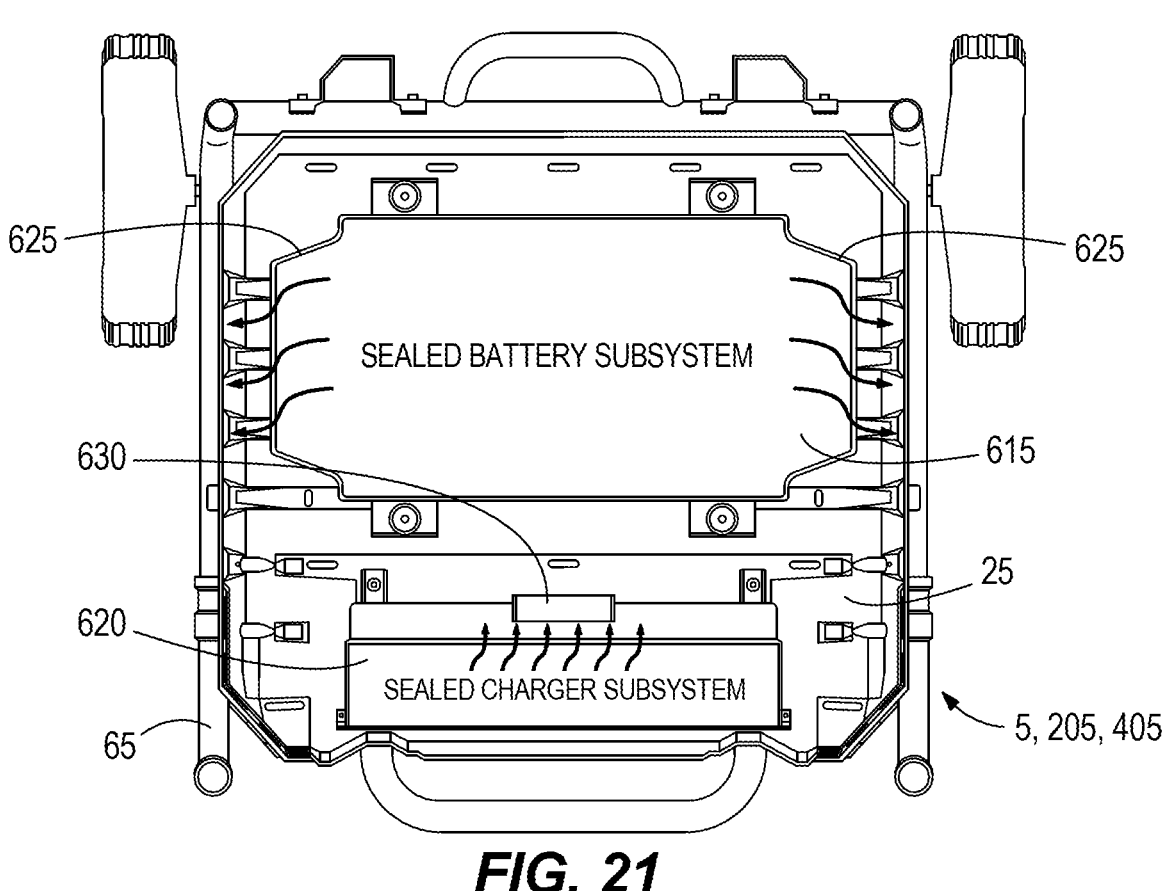
FIG. 21 is a schematic view of the portable power supply according to any of the embodiments of FIG. 1, FIG. 10, and FIG. 12.
Figure 22:
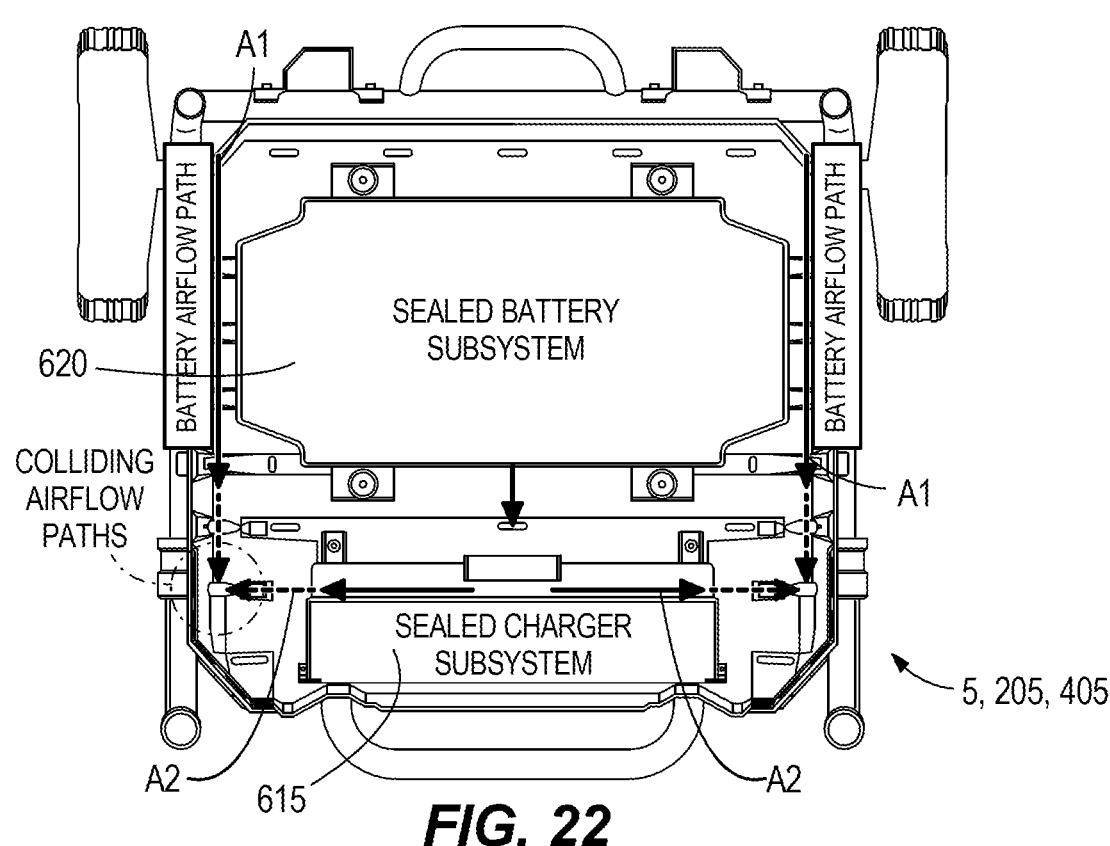
FIG. 22 is another schematic view of the portable power supply according to any of the embodiments of FIG. 1, FIG. 10, and FIG. 12.

One issue that may arise from fully rating each subsystem 615, 620 individually is that managing airflow and thermal performance may become more difficult when each subsystem 615, 620 is fully rated. For example, as illustrated in FIGS. 21 and 22, the battery subsystem 615 may utilize airflow A1 over end faces 625 of the battery subsystem 615 to accelerate the removal of heat while the charger subsystem 620 may utilize a dedicated impinging jet airflow A2 from a fan 630 through the center of the charger subsystem 620. As a result, the ideal air outflow path for the battery subsystem 615 and the charger subsystem 620 may be provided orthogonal to each other which may reduce the overall efficiency of the portable power supply 5, 205, 405 to remove heat.

Figure 23:
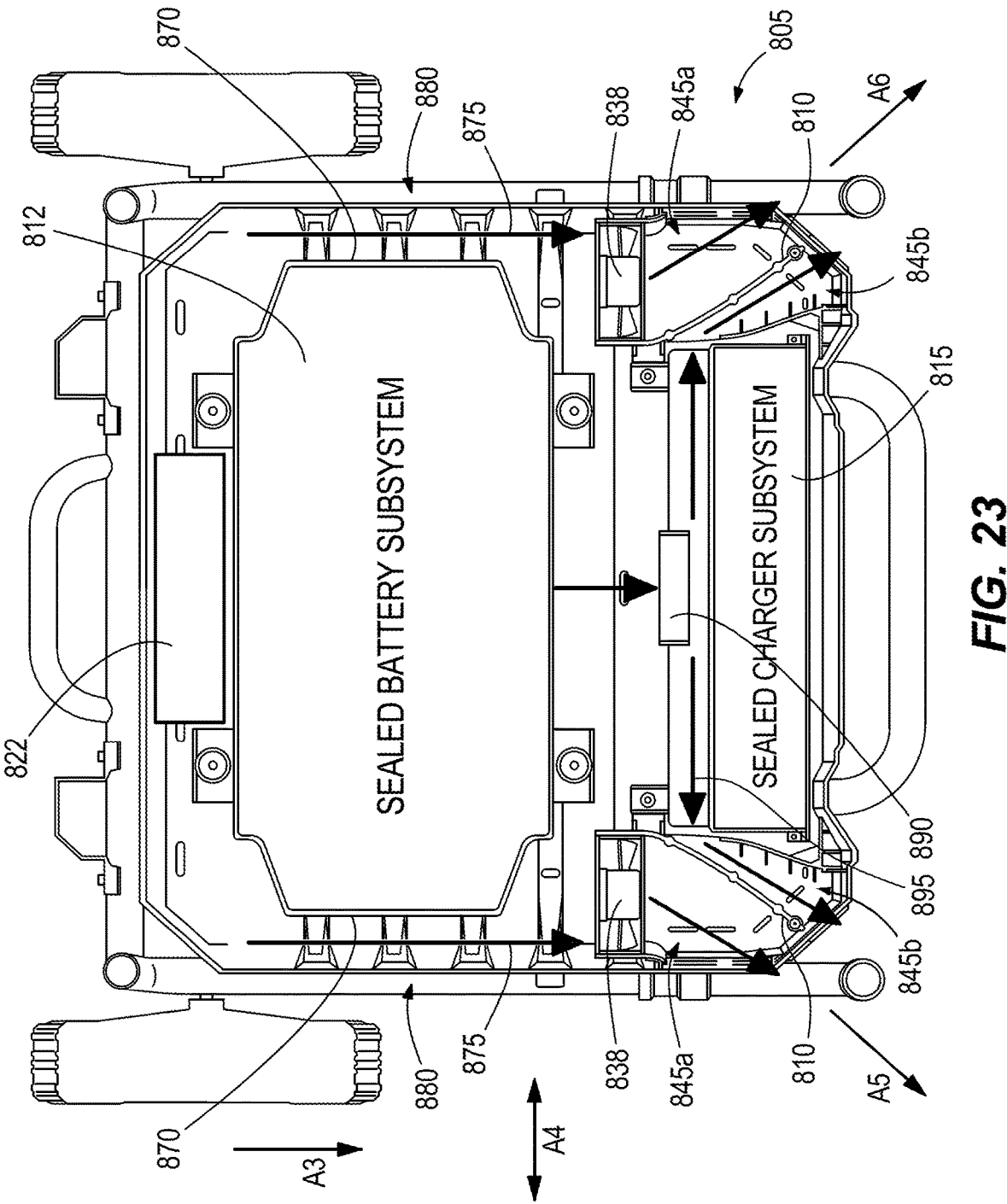
FIG. 23 is a schematic view of a portable power supply according to another embodiment of the disclosure.

FIG. 23 illustrates another embodiment of a portable power supply 805. The portable power supply 805 may include all features described herein with respect to the previous embodiment of the portable power supply 5, 205, 405 as well as the additional features described below. To mitigate thermal management and performance issues without unnecessarily increasing the size of the portable power supply 805, the portable power supply 805 may be provided with a combination air duct 810 that is configured to transfer heat from a battery subsystem 812, a first subsystem, and a charger subsystem 815, a second subsystem, out of a housing 820 of the portable power supply 805 in the same direction as each other. In the illustrated embodiment, the portable power supply 805 includes two combination air ducts 810. The battery subsystem 812 and the charger subsystem 815 are both disposed within a cavity defined by the housing 820. The portable power supply 805 may additionally be provided with a control system 822, such as a processor, a control board, or another similar control unit, that is disposed within the cavity defined by the housing 820 and configured to control operation of the portable power supply 805.

Figure 24:
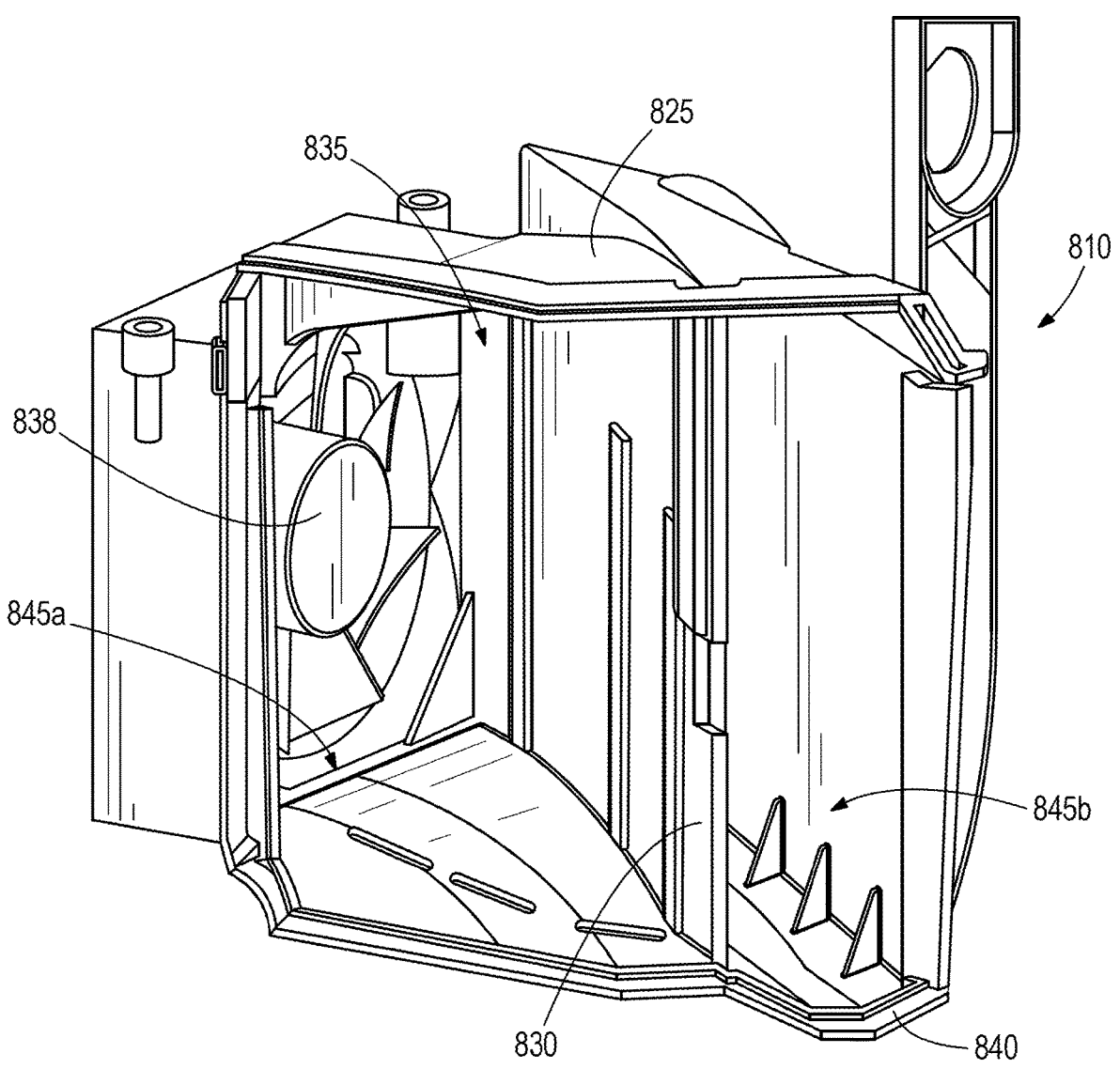
FIG. 24 is a perspective view of a combination air duct for the portable power supply of FIG. 23.

With reference to FIG. 24, the combination air duct 810 includes an outer housing 825, a baffle 830, an outlet opening 835, a fan 838, and a seal 840. The outer housing 825 defines an interior channel. The baffle 830 extends through the interior channel to divide the interior channel into a first subchannel 845a and a second subchannel 845b. The first subchannel 845a is larger in area and volume than the second subchannel 845b. The outlet opening 835 overlaps the first subchannel 845a and the second subchannel 845b such that the outlet opening 835 provides an opening for both the first subchannel 845a and the second subchannel 845b. The fan 838 is positioned opposite the outlet opening 835 in fluid communication with the first subchannel 845a. The seal 840 is provided on the outer housing 825 around an outer periphery of the outlet opening 835 and mates with the housing 820 of the portable power supply 805.

The seal 840 may be formed of any common sealant such as, but not limited to, water based latex sealant, acrylic sealant, and silicone sealant. The seal 840 is bendable and compressible such that the seal 840 may mate with irregularities in the housing 820. The seal 840 reduces airflow leakage at an interface between the outlet opening 835 of the combination air duct 810 and the housing 820. The seal 840 also inhibits debris (e.g., dust, water, aerosols, and other particulates) leakage, recirculation, and buildup within the overall system of the portable power supply 805. The seal 840 may additionally increase the required tolerance between the outlet opening 835 of the combination air duct 810 and the housing 820, thereby improving ease of manufacturing for the combination air duct 810. In some embodiments, the seal 840 may be formed with a thermoplastic elastomer overmold. As such, with additional reference to FIG. 25, the seal 840 may be intentionally formed to have an interference 848 with the housing 820 around a periphery of the outlet opening 835. The interference 848 between periphery of the outlet opening 835 and the portable power supply 805 may further improve the strength of the seal 840, thereby improving ingress protection of the portable power supply 805.

Figure 25:
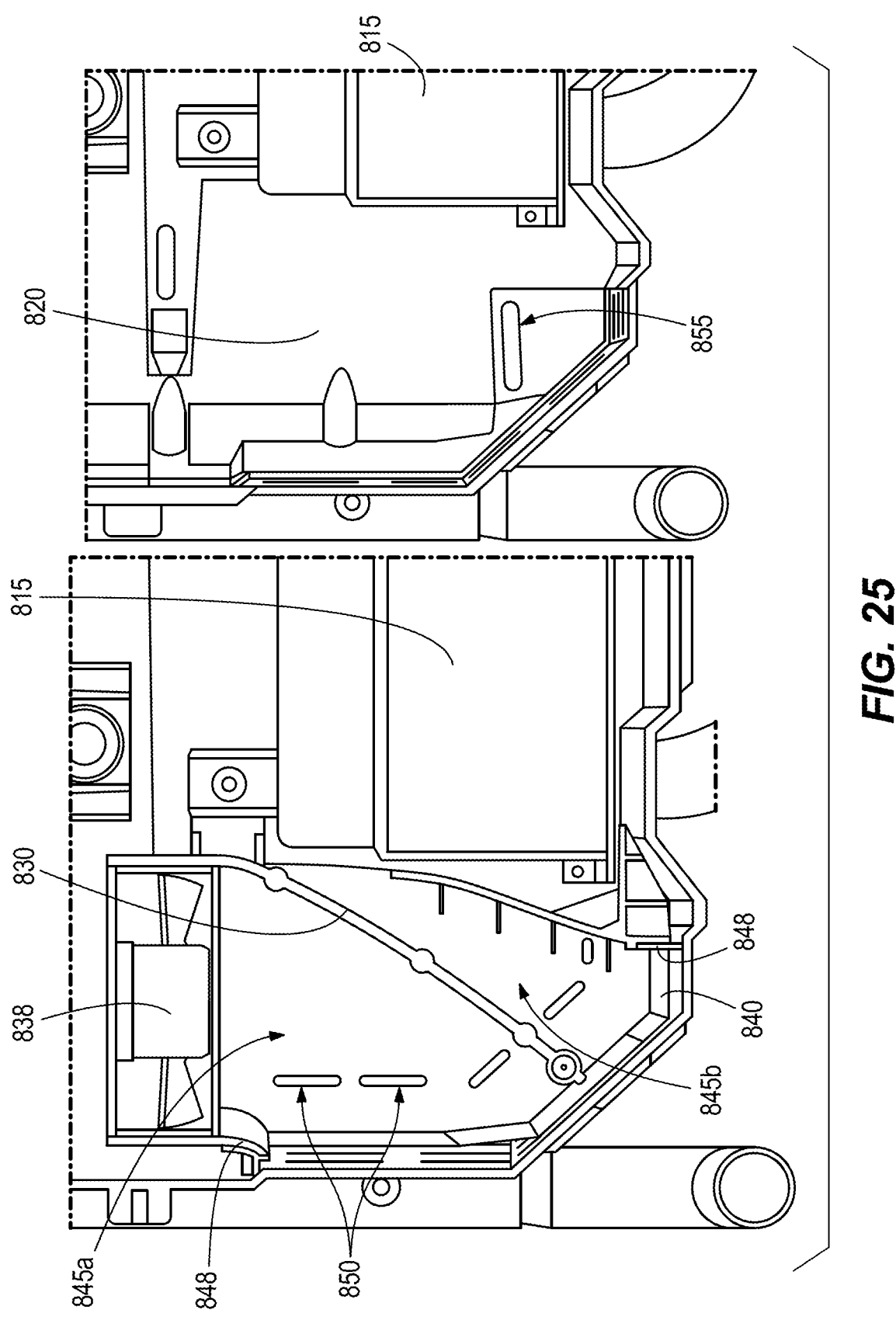
FIG. 25 is another schematic view of the portable power supply of FIG. 23.

In some embodiments, with continued reference to FIG. 25, the combination air duct 810 may additionally include ingress drain holes 850 that are in fluid communication with ingress outlet holes 855 provided in the housing 820 of the portable power supply 805. The ingress drain holes 850 and the ingress outlet holes 855 enable any ingress, such as water, that has entered the combination air duct 810 during operation of the portable power supply 805 to effectively drain out of the combination air duct 810 and the portable power supply 805. Therefore, the ingress drain holes 850 may improve the ability of the portable power supply 805 to remove ingress from housing 820 of the portable power supply 805.

Figure 26:
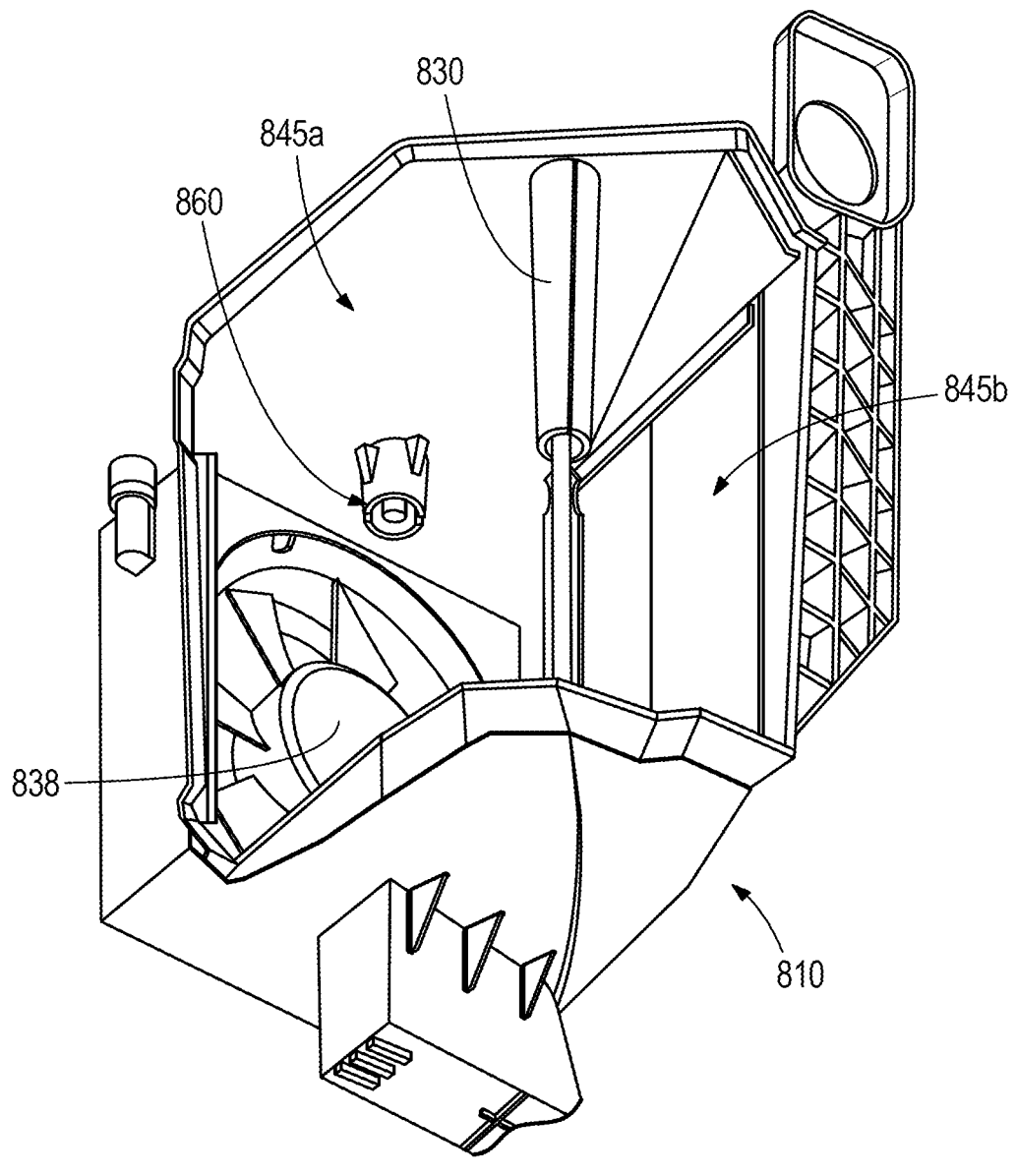
FIG. 26 is another perspective view of the combination air duct for the portable power supply of FIG. 24.

In further embodiments, as illustrated in FIGS. 23 and 26, the combination air duct 810 may additionally include a thermistor 860 provided adjacent to the fan 838. Specifically, the thermistor 860 is provided at a position downstream of the fan 838. The thermistor 860 enables a user to monitor system ambient temperatures of the portable power supply 805. Specifically, the thermistor 860 may determine the system ambient temperature at the location downstream of the fan 838 and provide, or convey, a temperature signal to the control system 822. In the illustrated embodiment, the system ambient temperature is the temperature of ambient air within the housing 820 of the portable power supply 805. In other embodiments, the system ambient temperature may be the temperature of ambient air surrounding the housing 820 of the portable power supply 805. As such, the portable power supply 805 includes an operating temperature range. Performance of the portable power supply 805 may worsen if the system ambient temperature is outside of the operating temperature range.

The control system 822 inhibits operation of the portable power supply 805 when the control system 822 receives a temperature signal from the thermistor 860 indicating that the ambient system temperature is outside of the operating temperature range for the portable power supply 805. Additionally, the fan 838 includes an operating temperature range. The control system 822 inhibits operation of the fan 838 when the control system 822 receives a temperature signal from the thermistor 860 indicating that the ambient system temperature is outside of the operating temperature range for the fan 838. The operating temperature range of the portable power supply 805 and the operating range of the fan 838 may be different such that the thermistor 860 may provide a temperature signal to the control system 822 to inhibit operation of just one of the portable power supply 805 and the fan 838 or both of the portable power supply 805 and the fan 838. As stated above, the portable power supply 805 includes two combination air ducts 810. Each duct 810 includes a fan 838 and a thermistor 860. As such, the control system 822 may inhibit operation of the portable power supply 805 when the control system 822 receives a temperatures signal from the thermistor 860 of at least one of the combination air ducts 810 that ambient system temperature is outside of the operating temperature range for the portable power supply 805.

Figures 27, 28:
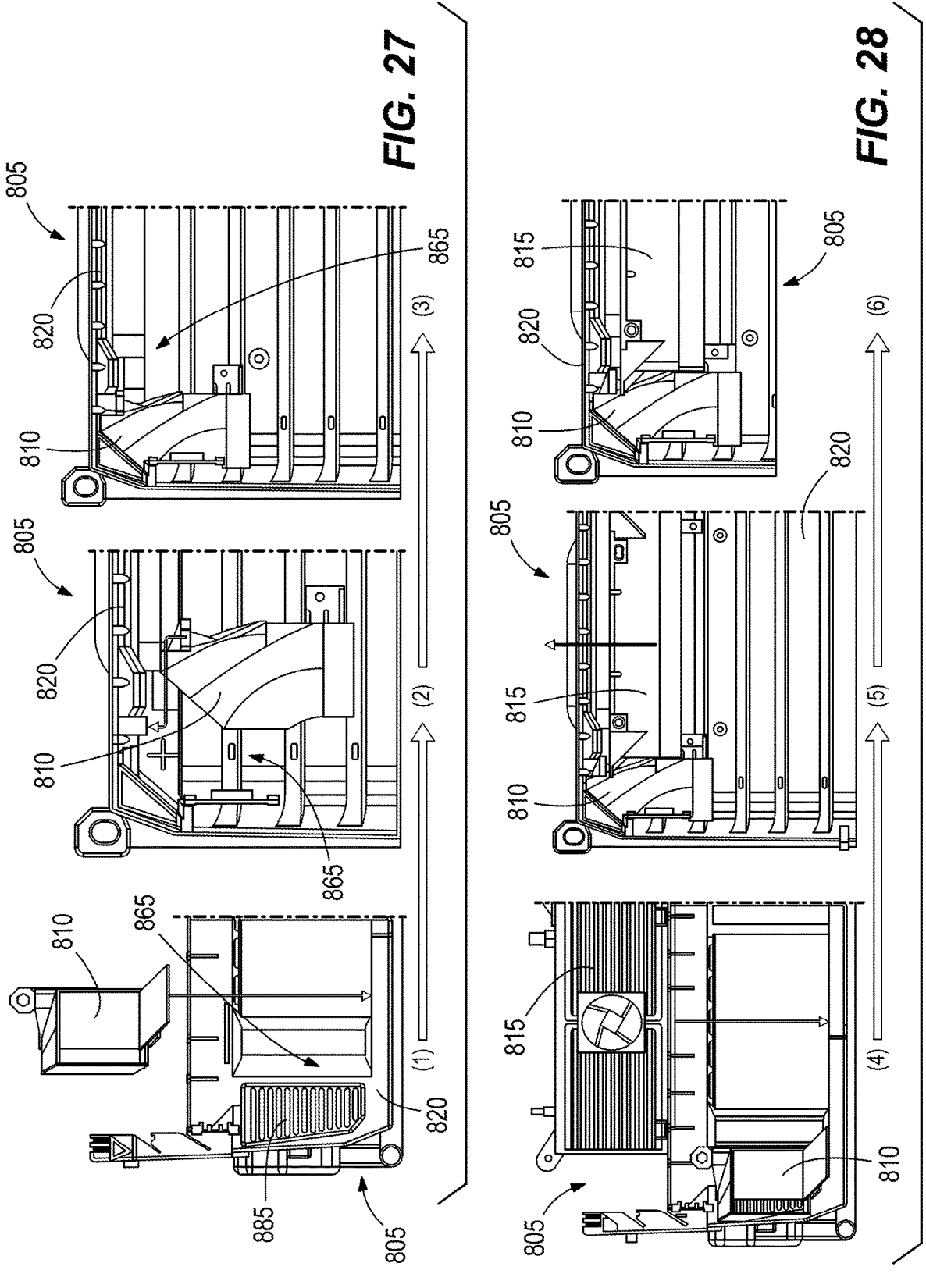
FIG. 27 is a schematic view illustrating installation of a combination air duct for the portable power supply of FIG. 23.
FIG. 28 is a schematic view illustrating installation of the combination air duct and a subsystem for the portable power supply of FIG. 23.

As illustrated in FIGS. 27 and 28, the portable power 805 includes a mounting port 865 for the charger subsystem 815 having mounting features such as fastener receiving apertures. The combination air duct 810 may be installed on the same mounting port 865 as the charger subsystem 815. By utilizing the same mounting port 865 as the charger subsystem 815, system integration and overall size of the portable power supply 805 is not substantially affected by the introduction of the combination air duct 810 to the portable power supply 805. As such, various components of the portable power supply 805 may be easily interchanged without altering the overall size of the portable power supply 805.

Returning reference to FIG. 23, during operation of the portable power supply 805, each of the battery subsystem 812 and the charger subsystem 815 emit heat. The battery subsystem 812 emits heat over end faces 870 of the battery subsystem 812. The fans 838 may then induce a first exhaust airflow 875 in a first direction A3, thereby transferring heat away from the battery subsystem 812. More specifically, the fans 838 may induce the first exhaust airflow 875 along conduits 880 that extend along the right side and the left side of the portable power supply 805, respectively. The first exhaust airflow 875 flows along the conduits 880 in the first direction A3 to reach the combination air duct 810. In the illustrated embodiment, the portable power supply 805 includes at least two combination air ducts 810 such that one combination air duct 810 is positioned on the right side and another combination air duct 810 is positioned on the left side of the portable power supply 805. As such, the right-side combination air duct 810 receives a portion of the first exhaust airflow 875, and the left-side combination air duct 810 receives another portion of the first exhaust airflow 875.

Figures 29, 30:
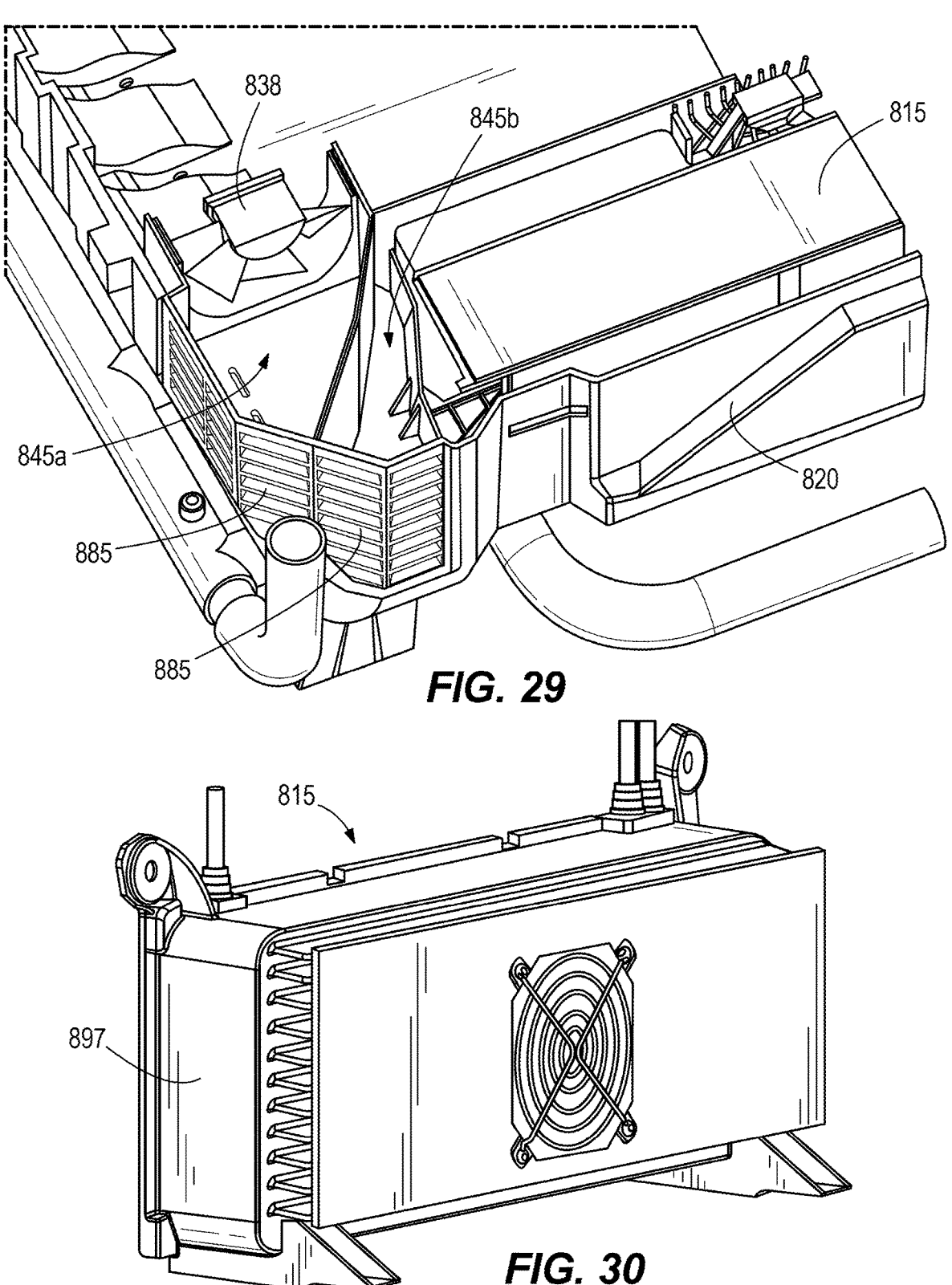
FIG. 29 is a perspective view of a portion of the portable power supply of FIG. 23.
FIG. 30 is a perspective view of a subsystem for the portable power supply of FIG. 23 according to an embodiment of the disclosure.

The fans 838 of each combination air duct 810 then direct the first exhaust airflow 875 to the first subchannel 845a so that the first exhaust airflow 875 may exit the portable power supply 805 via vents 885 in the housing 820 of the portable power supply 805, as illustrated in FIG. 29. With reference to FIGS. 23 and 29, the vents 885 are provided at the intersection between the left side and the front side of the portable power supply 805 as well as at the intersection between the right side and the front side of the portable power supply 805. As such, the first subchannel 845a in the left-side combination air duct 810 directs the first exhaust airflow 875 out of the housing 820 along a third direction A5, and the first subchannel 845a in the right-side combination air duct 810 directs the first exhaust airflow 875 out of the housing 820 along a fourth direction A6. Each of the third direction A5 and the fourth direction A6 extend diagonally, or transverse, to the first direction A3 and a second direction A4, which is described in more detail below.

In the illustrated embodiment, the charger subsystem 815 includes a charger fan 890. The charger fan 890 may induce a second exhaust airflow 895 in the second direction A4 towards the right side or the left side of the portable power supply 805. In the illustrated embodiment, the first direction A3 and the second direction A4 are orthogonal. In some embodiments, as illustrated in FIG. 30, the charger subsystem 815 may be provided with a cover 897. The cover 897 may be positioned over fins in the housing 820 to improve flow of the second exhaust airflow 895 away from the charger subsystem 815.

Returning reference to FIG. 23, as the second exhaust airflow 895 exits the charger subsystem 815, the second exhaust airflow 895 is directed into one of the right-side combination air duct 810 and the left-side combination air duct 810. As such, the right-side combination air duct 810 receives a portion of the second exhaust airflow 895, and the left-side combination air duct 810 receives another portion of the second exhaust airflow 895. The second exhaust airflow 895 is directed into the second subchannel 845b of each of the combination air ducts 810. The second subchannel 845b in the left-side combination air duct 810 directs the second exhaust airflow 895 out of the housing 820 along the third direction A5, and the second subchannel 845b in the right-side combination air duct 810 directs the second exhaust airflow 895 out of the housing 820 along the fourth direction A6. As such, the combination air duct 810 advantageously enables the first exhaust airflow 875 and the second exhaust airflow 895 to exit the portable power supply 805 along the same direction by redirected the first exhaust airflow 875 and the second exhaust airflow 895 such that inefficiencies from heat removal are reduced and heat may be quickly removed from the portable power supply 805 to inhibit the portable power supply 805 from overheating.

Figure 31:
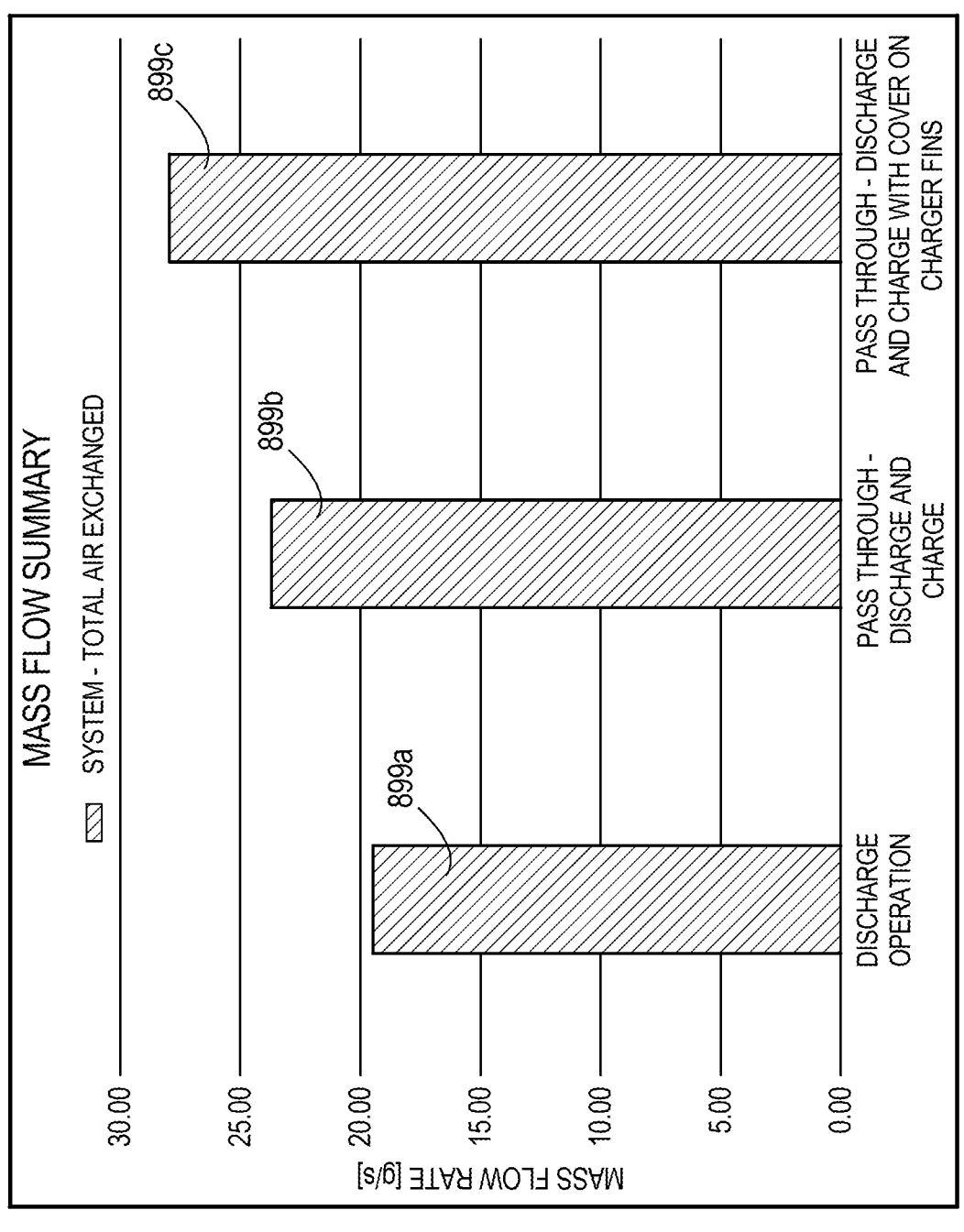
FIG. 31 is a graphical illustration of performance of the portable power supply.

FIG. 31 illustrates performance variance of the portable power supply 805. Specifically, FIG. 31 provides a graph of mass flow rate according to the various embodiments of the portable power supply. Under normal discharge conditions, illustrated by bar 899a, the portable power supply 805 may exchange air at a mass flow rate of less than 20 g/s. More specifically, the portable power supply 805 may exchange air at a mass flow rate of roughly 19 g/s. Under conditions in which the charger fan 890 is provided, illustrated by bar 899b, the portable power supply 805 may exchange air at a mass flow rate between 20 and 25 g/s. More specifically, the portable power supply 805 may exchange air at a mass flow rate of roughly 23 g/s. Under conditions in which the charger fan 890 and the cover 897 is provided with the charger subsystem 815, illustrated by bar 899c, the portable power supply 805 may exchange air at a mass flow rate between 25 and 30 g/s. More specifically, the portable power supply 805 may exchange air at a mass flow rate of roughly 27.5 g/s.

Returning reference to FIGS. 21 and 22, in another embodiment of the portable power supply 5, 205, 405, each subsystem of the portable power supply 5, 205, 405 may be designed to an Ingress Protection Code or Underwriter's Laboratories Rating that is lower than the desired rating. For example, each subsystem may be designed and manufactured to have a solid IP Code of 3 and a liquid IP Code of 5. At a solid IP Code of 3, each subsystem is protected against solid objects over 2.5 mm, such as a screwdriver. At a liquid IP Code of 5, each subsystem is protected against harmful effects from water jets in all direction. Once each of the subsystems 615, 620 are integrated within the housing 25 and the frame 65 of the portable power supply 5, 205, 405, each of the subsystems 615, 620, and the overall system of the portable power supply 5, 205, 405 achieve the desired fully rated IP Code or UL Rating. By partially rating each subsystem 615, 620 such that the portable power supply 5, 205, 405 achieves the desired fully rated IP Code or UL Rating when fully assembled, the portable power supply 5, 205, 405 may advantageously have improved system thermal management and performance. The partial rating of each subsystem 615, 620 may also reduce manufacturing costs and improve manufacturing ease.

As described above, some or all illustrated features may be omitted in a particular implementation within the scope of the present disclosure, and some illustrated features may not be required for implementation of all embodiments. The features described above may be implemented in an order different from the order described above and does not prohibit implementation in another order or combination. While not explained in detail for each embodiment and/or construction, the features of the disclosure described herein may be included on a tape dispenser independent of other features and are not limited to the illustrated disclosure. Embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Although the invention has been described with reference to certain embodiments, variations and modifications exist within the scope and spirit of one or more independent aspects of the invention as described. Various features of the invention are set forth in the following claims.

What is claimed is:

1. A portable power supply comprising:

a housing defining a cavity, the housing including an upper portion, a lower portion, a plurality of air inlets defined in the lower portion, the plurality of air inlets in fluid communication with the cavity, and a plurality of air outlets defined in the upper portion, the plurality of air outlets in fluid communication with the cavity;

at least one battery cell disposed in the cavity;

a charger electrically coupled with the battery cell;

an attachment coupled to the upper portion by a plurality of fasteners, the attachment configured to at least partially cover each of the air outlets such that airflow exiting the air outlets travels a circuitous path, the attachment including a first side facing the upper portion and a second side opposite the first side, the second side including a coupling interface, the attachment 50 configured to supply power to the coupling interface, the coupling interface is configured to engage a stacking interface of a chargeable structure.

2. The portable power supply of claim 1, wherein at least one of the plurality of air inlets is additionally configured as a liquid drain opening.

3. The portable power supply of claim 1, wherein the plurality of air outlets is upwardly facing in a direction away from the lower portion.

4. The portable power supply of claim 1, wherein the attachment includes a wall angled relative to an axis that is defined by and extends through the plurality of air outlets such that the wall redirects airflow.

5. The portable power supply of claim 4, wherein the attachment includes a downwardly depending sidewall, the downwardly depending sidewall defining a plurality of attachment outlet apertures such that airflow redirected by the wall is configured to exit through the plurality of attachment outlet apertures.

6. The portable power supply of claim 5, wherein the upper portion includes an upwardly extending ridge disposed adjacent the plurality of air outlets.

7. The portable power supply of claim 6, wherein the upper portion further includes a drainage trough, the ridge disposed between the drainage trough and the plurality of air outlets.

8. The portable power supply of claim 7, wherein the attachment includes a gap between the downwardly depending sidewall and the wall, the gap in fluid communication with the drainage trough.

9. The portable power supply of claim 8, wherein the drainage trough extends along at least a portion of the perimeter of the upper portion.

10. The portable power supply of claim 9, wherein the upper portion further includes a plurality of drainage openings, the drainage trough in fluid communication with the drainage openings.

11. The portable power supply of claim 1, wherein the charger is disposed in the cavity.

* * * * *